(12) United States Patent
Yasui

(10) Patent No.: US 11,981,344 B2
(45) Date of Patent: *May 14, 2024

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,770

(22) Filed: Mar. 24, 2023

(65) Prior Publication Data

US 2023/0242141 A1 Aug. 3, 2023

Related U.S. Application Data

(62) Division of application No. 17/225,297, filed on Apr. 8, 2021.

(30) Foreign Application Priority Data

Apr. 20, 2020 (JP) ................................. 2020-074783
Oct. 12, 2020 (JP) ................................. 2020-171974

(51) Int. Cl.
*B60Q 1/00* (2006.01)
*B60W 30/18* (2012.01)
(Continued)

(52) U.S. Cl.
CPC ...... *B60W 50/14* (2013.01); *B60W 30/18163* (2013.01); *B60W 40/105* (2013.01);
(Continued)

(58) Field of Classification Search
CPC ........... B60W 50/14; B60W 30/18163; B60W 40/105; B60W 40/107; B60W 2050/143;
(Continued)

(56) References Cited

U.S. PATENT DOCUMENTS 8,248,223 B2 8/2012 Periwal
8,483,949 B2 7/2013 Taguchi et al.
(Continued)

FOREIGN PATENT DOCUMENTS

CN 105460014 4/2016
CN 110097785 8/2019
(Continued)

OTHER PUBLICATIONS

Chinese Office Action for Chinese Patent Application No. 202110415904.0 dated Jun. 30, 2023.
(Continued)

*Primary Examiner* — Anh V La
(74) *Attorney, Agent, or Firm* — Amin, Turocy & Watson, LLP

(57) ABSTRACT

A driving assistance device includes a determining part configured to determine a target relative position with respect to other vehicle, which is traveling in a movement destination lane that is a merging destination or a lane change destination of a host vehicle, for entering the movement destination lane based on a detection result of the other vehicle, and a notification controller configured to output a notification sound, which differs between a case in which acceleration is required for the host vehicle and a case in which deceleration is required for the host vehicle, from a speaker in order to perform an alignment with respect to the target relative position determined by the determining part in an advancing direction of the host vehicle.

24 Claims, 20 Drawing Sheets

(51) Int. Cl.
*B60W 40/105* (2012.01)
*B60W 40/107* (2012.01)
*B60W 50/14* (2020.01)

(52) U.S. Cl.
CPC ..... *B60W 40/107* (2013.01); *B60W 2050/143* (2013.01); *B60W 2554/80* (2020.02)

(58) Field of Classification Search
CPC .. B60W 2554/80; B60W 2520/10; B60Q 9/00
USPC ....... 340/438, 435, 439, 466, 901, 902, 905, 340/936
See application file for complete search history.

(56) References Cited

U.S. PATENT DOCUMENTS

| | | | |
|---|---|---|---|
| 8,583,329 | B2 | 11/2013 | Breed |
| 10,843,710 | B2* | 11/2020 | Seo ........................ B60W 50/10 |
| 2007/0032943 | A1 | 2/2007 | Okabe |
| 2008/0119993 | A1 | 5/2008 | Breed |
| 2009/0088925 | A1* | 4/2009 | Sugawara ............. B60W 30/12 340/436 |
| 2010/0045451 | A1 | 2/2010 | Periwal |
| 2013/0250112 | A1 | 9/2013 | Breed |
| 2016/0091896 | A1 | 3/2016 | Maruyama |
| 2016/0272204 | A1* | 9/2016 | Takahashi ........... B60W 30/165 |
| 2019/0179330 | A1* | 6/2019 | Oniwa ..................... G05D 1/02 |
| 2019/0283671 | A1 | 9/2019 | Shimomura et al. |
| 2019/0378040 | A1 | 12/2019 | Ali et al. |

FOREIGN PATENT DOCUMENTS

| | | |
|---|---|---|
| JP | 2005-053401 | 3/2005 |
| JP | 2006-244142 | 9/2006 |
| JP | 2007-042003 | 2/2007 |
| JP | 2007-133486 | 5/2007 |

OTHER PUBLICATIONS

Non-Final Office Action for U.S. Appl. No. 17/225,297 dated Feb. 27, 2023.

Non-Final Office Action for U.S. Appl. No. 17/225,297 dated Nov. 25, 2022.

Japanese Office Action for Japanese Patent Application No. 2020-171974 dated Oct. 24, 2023.

* cited by examiner

FIG. 11

| NECESSARY ACCELERATION/ DECELERATION | SOUND PARAMETER Psound | TONE HEIGHT | INTERVAL |
|---|---|---|---|
| ACCELERATON LARGE | +5 | HIGH | SHORT |
| ↑ | +4 | | ↑ |
| | +3 | | |
| | +2 | | |
| | +1 | | ↓ |
| | 0 | MIDDLE | LONG |
| | −1 | LOW | ↑ |
| | −2 | | |
| | −3 | | |
| ↓ | −4 | | ↓ |
| DECELERATION LARGE | −5 | | SHORT |

FIG. 12

| NECESSARY ACCELERATION/ DECELERATION | SOUND PARAMETER Psound | TONE HEIGHT | INTERVAL |
|---|---|---|---|
| ACCELERATON LARGE ↑ | +5 | HIGH ↑ | SHORT ↑ |
| | +4 | | |
| | +3 | | |
| | +2 | | |
| | +1 | | |
| | 0 | | LONG |
| | −1 | | ↑ |
| | −2 | | |
| | −3 | | |
| ↓ | −4 | ↓ | ↓ |
| DECELERATION LARGE | −5 | LOW | SHORT |

155

| DRIVER ID | INCLINATION α |
|---|---|
| 100001 | *** |
| 100002 | *** |
| 100003 | *** |
| ⋮ | ⋮ |

156

DRIVING ASSISTANCE DEVICE, DRIVING ASSISTANCE METHOD, AND STORAGE MEDIUM

CROSS-REFERENCE TO RELATED APPLICATIONS

This application is a Divisional of application Ser. No. 17/225,297 filed on Apr. 8, 2021, the entire contents of which are incorporated herein by reference.

Priority is claimed on Japanese Patent Application No. 2020-074783, filed Apr. 20, 2020, and Japanese Patent Application No. 2020-171974, filed Oct. 12, 2020, the contents of which are incorporated herein by reference.

BACKGROUND OF THE INVENTION

Field of the Invention

The present invention relates to a driving assistance device, a driving assistance method, and a storage medium.

Description of Related Art

When it is determined that the target acceleration or deceleration has reached the limit value, a vehicle that uses a buzzer to inform that a target acceleration or deceleration has reached a limit value is known (Japanese Unexamined Patent Application, First Publication No. 2005-053401). In addition, a vehicle that notifies a braking operation start using a buzzer sound when the vehicle itself has reached a braking operation start point, reduces the buzzer sound according to a decrease in vehicle speed, and informs a speed difference with respect to a deceleration target by a sound volume of the buzzer sound is known (Japanese Unexamined Patent Application, First Publication No. 2007-133486).

SUMMARY OF THE INVENTION

In the technology in the related art, convenience may be insufficient depending on a traveling situation.

An aspect of the present invention is directed to providing a driving assistance device, a driving assistance method, and a storage medium that are capable of improving convenience.

A driving assistance device, a driving assistance method, and a storage medium according to the present invention employ the following configurations.

(1) A driving assistance device according to an aspect of present invention includes a determining part configured to determine a target relative position with respect to other vehicle, which is traveling in a movement destination lane that is a merging destination or a lane change destination of a host vehicle, for entering the movement destination lane based on a detection result of the other vehicle, and a notification controller configured to output a notification sound, which differs between a case in which acceleration is required for the host vehicle and a case in which deceleration is required for the host vehicle, from a speaker in order to perform an alignment with respect to the target relative position determined by the determining part in an advancing direction of the host vehicle.

(2) In the aspect of the above-mentioned (1), the notification controller may make tone heights of the notification sound different between the case in which the acceleration is required and the case in which the deceleration is required.

(3) In the aspect of the above-mentioned (1) or (2), the notification controller may output the notification sound with a higher tone height in the case in which the acceleration is required than the case in which the deceleration is required.

(4) In the aspect of any one of the above-mentioned (1) to (3), the notification controller may make tone colors of the notification sound different between the case in which the acceleration is required and the case in which the deceleration is required.

(5) In the aspect of any one of the above-mentioned (1) to (4), the notification controller may make intervals of the notification sound different according to a speed variation degree of the host vehicle which is required to perform the alignment.

(6) In the aspect of the above-mentioned (5), the notification controller may shortens the interval as a necessary degree of acceleration increases as the speed variation degree, and shortens the interval as a necessary degree of deceleration increases as the speed variation degree.

(7) In the aspect of any one of the above-mentioned (1) to (6), the notification controller may make tone heights, sound volumes, or tone colors of the notification sound different according to a speed variation degree of the host vehicle required to perform the alignment.

(8) In the aspect of the above-mentioned (7), the notification controller may make the tone height of the notification sound higher as a necessary degree of acceleration increases as the speed variation degree, and make the tone height of the notification sound lower as a necessary degree of deceleration increases as the speed variation degree.

(9) In the aspect of the above-mentioned (7) or (8), the notification controller may make the sound volume louder as a necessary degree of acceleration increases as the speed variation degree, and make the sound volume louder as a necessary degree of deceleration increases as the speed variation degree.

(10) In the aspect of any one of the above-mentioned (1) to (9), the notification controller may change one or more elements among a tone height, a sound volume, a tone color, or an interval of the notification sound according to whether the acceleration or the deceleration is required for the host vehicle in order to perform the alignment, and change one or more other elements among the tone height, the sound volume, the tone color, or the interval of the notification sound according to a speed variation degree of the host vehicle which is required to perform the alignment.

(11) In the aspect of any one of the above-mentioned (1) to (10), the determining part may determine a target speed to perform merging or lane change, and the notification controller may determine the notification sound based on driving power which causes a position and a speed of the host vehicle to simultaneously converge with respect to the target relative position and the target speed which are determined by the determining part, and outputs the determined notification sound from the speaker.

(12) In the aspect of the above-mentioned (11), the driving assistance device may further include a deriving part configured to derive the driving power, which causes the position and the speed of the host vehicle to simultaneously converge with respect to the target relative position and the target speed which are determined by the determining part, based on response designated control, and the notification controller may determine the notification sound based on the driving power derived by the deriving part, and output the determined notification sound from the speaker.

(13) In the aspect of the above-mentioned (12), the deriving part may derive the driving power so as to bring a switching function, which is obtained by linearly coupling a position deviation that is a deviation between the target relative position and a position of the host vehicle and a speed deviation that is a deviation between the target speed and a speed of the host vehicle, closer to zero and so as to bring the position deviation and the speed deviation closer to zero.

(14) In the aspect of the above-mentioned (12), the deriving part may determine a correction amount of the target speed so as to bring a first switching function, which is obtained by linearly coupling a position deviation that is a deviation between the target relative position and a position of the host vehicle and a past value of the position deviation, closer to zero and so as to bring the position deviation and the past value of the position deviation closer to zero, and determine the target speed by correcting a temporary target speed using the correction amount based on the speed of the other vehicle and derives the driving power to bring a second switching function obtained by linearly coupling a speed deviation that is a deviation between the target speed and a speed of the host vehicle and a past value of the speed deviation closer to zero and bring the speed deviation and the past value of the speed deviation closer to zero.

(15) In the aspect of any one of the above-mentioned (1) to (14), the notification controller may change the notification sound according to depression characteristics for each driver with respect to an accelerator pedal.

(16) In the aspect of any one of the above-mentioned (1) to (15), the notification controller may change the notification sound according to a distance that is usable in merging or lane change.

(17) In the aspect of any one of the above-mentioned (1) to (16), the driving assistance device may further include a steering determining part configured to determine a steering timing to enter the movement destination lane, and the notification controller may output a steering instruction sound, which is different from the notification sound, from the speaker at the steering timing determined by the steering determining part.

(18) In the aspect of any one of the above-mentioned (1) to (17), the notification controller may start output of the notification sound according to entry of the host vehicle into a guiding start range which is between a front section of a preceding vehicle that is traveling just in front of the target relative position in the movement destination lane and a rear section of a following vehicle that is traveling just behind the target relative position in the movement destination lane in the advancing direction of the host vehicle.

(19) In the aspect of the above-mentioned (18), the notification controller may output a guiding start notification sound, which is different from the notification sound, from the speaker prior to an output start of the notification sound in a case the host vehicle enters the guiding start range.

(20) In the aspect of any one of the above-mentioned (1) to (19), the driving assistance device may further include an entry possibility determining part configured to determine possibility of whether the vehicle is able to enter the movement destination lane, and the notification controller may output a guiding stop notification sound, which is different from the notification sound, from the speaker in a case the entry possibility determining part determines that the entry to the movement destination lane is impossible after the output of the notification sound has been started.

(21) In the aspect of any one of the above-mentioned (1) to (20), the notification controller may not output the notification sound from the speaker in a case acceleration and deceleration are not required to perform the alignment.

(22) A driving assistance device according to another aspect of the present invention includes a determining part configured to determine a target relative position with respect to other vehicle, which is traveling in a movement destination lane that is a merging destination or a lane change destination of a host vehicle, for entering the movement destination lane based on a detection result of the other vehicle; and a notification controller configured to output a notification sound, which has different tone heights, sound volumes, tone colors, or intervals according to a speed variation degree of the host vehicle, from the speaker, the speed variation degree of the host vehicle being a degree required to perform alignment with respect to the target relative position determined by the determining part in an advancing direction of the host vehicle.

(23) A driving assistance method according to another aspect of the present invention is performed by a computer, the method including determining a target relative position with respect to other vehicle, which is traveling in a movement destination lane that is a merging destination or a lane change destination of a host vehicle, for entering the movement destination lane based on a detection result of the other vehicle; and outputting a notification sound, which differs between a case in which acceleration is required for the host vehicle and a case in which deceleration is required for the host vehicle, from a speaker in order to perform an alignment with respect to the determined target relative position in an advancing direction of the host vehicle.

(24) A storage medium according to another aspect of the present invention is a computer-readable storage medium, on which a program is stored and causes a computer to determine a target relative position with respect to other vehicle, which is traveling in a movement destination lane that is a merging destination or a lane change destination of a host vehicle, for entering the movement destination lane based on a detection result of the other vehicle; and output a notification sound, which differs between a case in which acceleration is required for the host vehicle and a case in which deceleration is required for the host vehicle, from a speaker in order to perform an alignment with respect to the determined target relative position in an advancing direction of the host vehicle.

According to the aspects of the above-mentioned (1) to (24), it is possible to improve convenience.

BRIEF DESCRIPTION OF THE DRAWINGS

FIG. 11 is a view conceptually showing an example of notification sound information.

FIG. 12 is a view conceptually showing another example of the notification sound information.

DETAILED DESCRIPTION OF THE INVENTION

Hereinafter, embodiments of a driving assistance device, a driving assistance method, and a program of the present invention will be described with reference to the accompanying drawings. In the following description, the same reference signs designate components having the same or similar functions. Then, overlapping description of these configurations may be omitted. A phrase "based on XX" means "on the basis of at least XX" and may also include a case based on another element in addition to XX. The "based on XX" is not limited to a case in which XX is directly used and may include a case in which additional calculation or processing is performed with respect to XX. A phrase "XX or YY" is not limited to a case of any one of XX and YY and may also include both of cases of XX and YY. This is also similar to a case in which selective elements are three or more. Terms "XX" and "YY" are arbitrary elements (for example, arbitrary information).

First Embodiment

[1. Vehicle Configuration]

Figure 1:
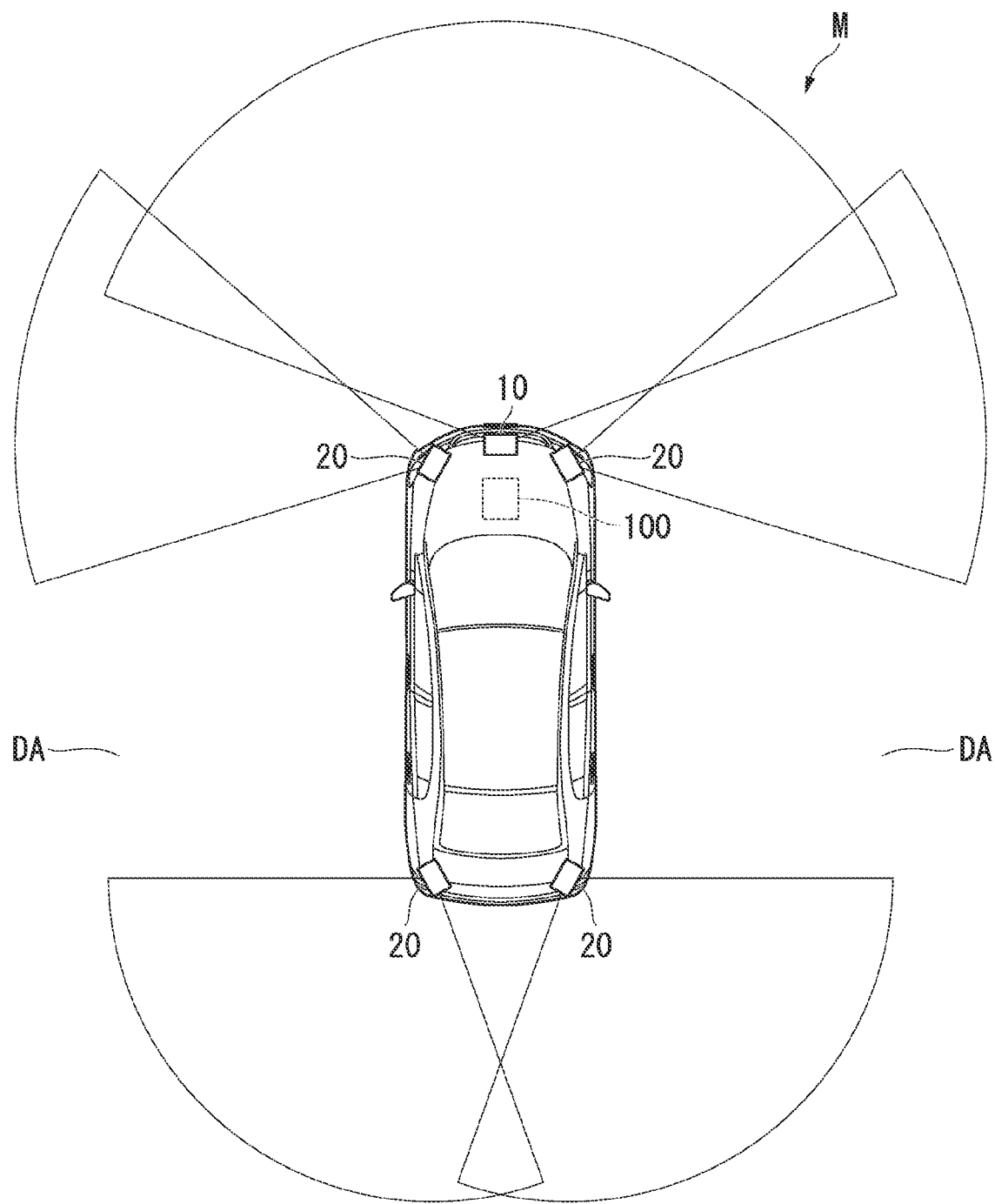
FIG. 1 is a plan view showing a vehicle of a first embodiment.

FIG. 1 is a plan view showing a vehicle M (hereinafter, may also be referred to as "a host vehicle M") in which a driving assistance device 100 of a first embodiment is mounted. The vehicle M is, for example, an automobile such as a two-wheeled, three-wheeled or four-wheeled automobile, which is an automobile using an internal combustion engine such as a diesel engine, a gasoline engine, or the like, as a power source, an electric automobile using a generator as a power source, a hybrid automobile including both of an internal combustion engine and a generator, or the like. For example, the electric automobile is driven using electric power discharged from a battery such as a secondary battery, a hydrogen fuel cell, a metal fuel cell, an alcohol fuel cell, or the like.

As shown in FIG. 1, the vehicle M includes, for example, a front camera 10 (hereinafter, referred to as "a camera 10"), a plurality of radar devices 20, and the driving assistance device 100.

The camera 10 is provided in, for example, a front section of the vehicle M, and can photograph a side in front of the vehicle M. A photographing range of the camera 10 shown in FIG. 1 is conceptual. The camera 10 can photograph another vehicle that travels on a relatively far forward side (for example, photograph a preceding vehicle Mf at a position of the vehicle M in FIG. 15A). The radar devices 20 are provided at, for example, four corner portions of the vehicle M and, can monitor both sides in front of and both sides behind the vehicle M. The radar device 20 is, for example, millimeter wave radar but is not limited thereto.

The vehicle M of the embodiment is a vehicle that is assumed to be driven by an occupant, and has a simpler monitoring sensor group (the camera 10 and the radar devices 20) than a so-called automatic driving vehicle (an automatic driving vehicle of Level 3 or higher). For this reason, a dead angle zone DA that is not detected by the monitoring sensor group may be present on a side in front of the vehicle M. However, the vehicle M may have a monitoring sensor group that can monitor 360 degrees around the vehicle M, like the automatic driving vehicle of Level 3 or higher.

The driving assistance device 100 is a device that can assist smooth merging or lane change to a main driving lane, and assists driving by an occupant (a driver) by outputting a guiding notification sound from a speaker 60, which will be described below. The driving assistance device 100 will be described below in detail.

The vehicle M has a power source (a driving source), various types of operating devices, an operation detecting sensor, and the like, of the vehicle M as components of a general vehicle, in addition to the above-mentioned configurations. The power source includes, for example, an internal combustion engine or the like, and/or a generator. The various types of operating devices include, for example, an accelerator pedal 31 (see FIG. 5), a steering wheel, a brake pedal, a shift lever, and the like. Various types of operation detecting sensors each includes an accelerator opening sensor 32 (see FIG. 5), a steering torque sensor, a brake sensor, a shift position sensor, and the like. The accelerator opening sensor 32 detects an accelerator opening degree Qap according to a depression amount of a driver with respect to the accelerator pedal 31.

[2. Situation Example of Merging/Lane Change]

Next, referring to FIG. 2 to FIG. 4, difficulty of driving in merging/lane change will be described. Hereinafter, a term "merging" is used as meaning including both of "merging to a main traveling lane" and "lane change."

Figure 2:
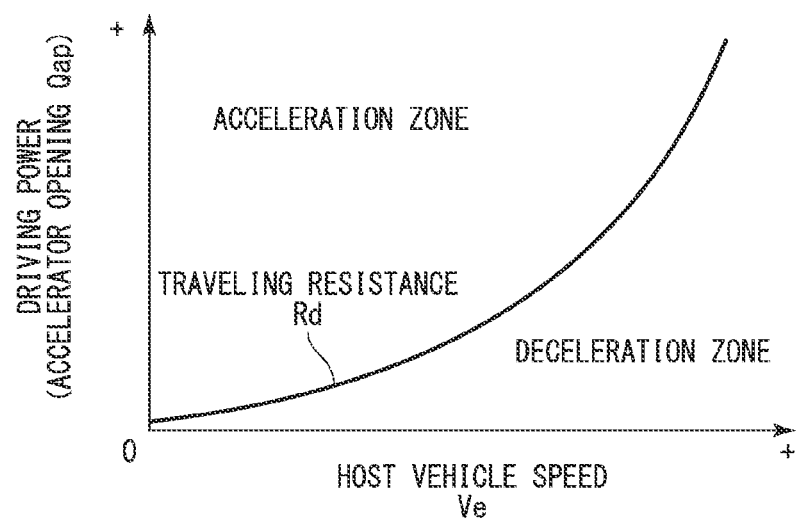
FIG. 2 is a graph showing a relationship between a host vehicle speed and a driving power.

FIG. 2 is a graph showing a relationship between a host vehicle speed Ve that is a speed of the host vehicle M and a driving power of the host vehicle M (the accelerator opening Qap). As shown in FIG. 2, a traveling resistance Rd increases exponentially as the host vehicle speed Ve is increased. A zone in which the driving power of the host vehicle M with respect to the host vehicle speed Ve is greater than the traveling resistance Rd is an acceleration zone in which the vehicle M is accelerated. A zone in which the driving power of the host vehicle M with respect to the host vehicle speed Ve is smaller than the traveling resistance Rd is a deceleration zone in which the vehicle M is decelerated.

Figure 3:
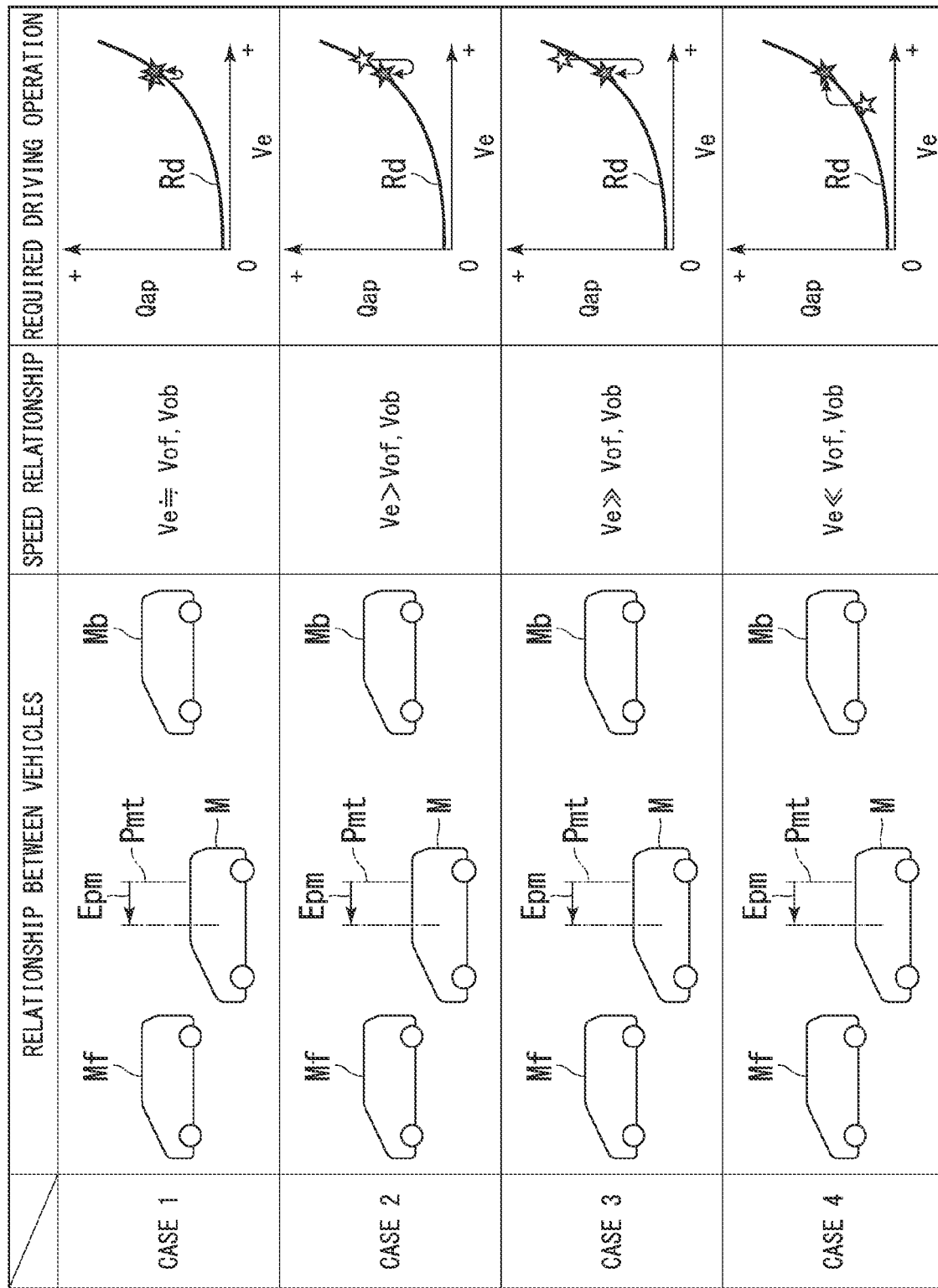
FIG. 3 is a view showing several situations (cases 1 to 4) related to merging.

FIG. 3 is a view showing several situations (cases 1 to 4) related to merging. The cases 1 to 4 are classifications that focus on differences in speed relationship between the host vehicle M and another vehicle. Hereinafter, among other vehicles which are traveling on a lane which is a merging destination of the host vehicle M (a movement destination lane, a neighboring lane), the other vehicle that travels just in front of a merging target position is referred to as "a preceding vehicle Mf" and the other vehicle that travels just behind the merging target position is referred to as "a following vehicle Mb." In addition, hereinafter, a speed of the preceding vehicle Mf is defined as "speed Vof," a speed of the following vehicle Mb is defined as "speed Vob," a target merging relative position set between the preceding vehicle Mf and the following vehicle Mb is defined as "a target merging relative position Pmt," and a positional error of the host vehicle M with respect to the target merging relative position Pmt is defined as "a relative positional error Epm." The target merging relative position Pmt is, for example, set to a central position between the preceding vehicle Mf and the following vehicle Mb in an advancing direction of the vehicle, or a position slightly forward compared to the central position. In a right graph in FIG. 3, a white star mark indicates "a driving power upon merging start," and a hatched star mark indicates "a driving power upon merging."

The case 1 is a case in which the host vehicle speed Ve is substantially the same as the speed Vof of the preceding vehicle Mf and the speed Vob of the following vehicle Mb (a relative speed is substantially zero), and the host vehicle M is located slightly forward compared to the target merging relative position Pmt. In this case, a driver needs to slightly return the accelerator pedal 31 to perform deceleration, and then, depress the accelerator pedal 31 again to return to an original accelerator opening degree.

The case 2 is a case in which the host vehicle speed Ve is slightly greater than the speed Vof of the preceding vehicle Mf and the speed Vob of the following vehicle Mb, and the host vehicle M is located slightly forward compared to the target merging relative position Pmt. In this case, a driver needs to return the accelerator pedal 31 to an appropriate value to perform deceleration, and then, depress the accelerator pedal 31 again to obtain an appropriate accelerator opening degree which is smaller than the original accelerator opening degree.

The case 3 is a case in which the host vehicle speed Ve is excessively greater than the speed Vof of the preceding vehicle Mf and the speed Vob of the following vehicle Mb, and the host vehicle M is located slightly forward compared to the target merging relative position Pmt. In this case, a driver needs to greatly return the accelerator pedal 31 to perform deceleration in order to suppress an excessive speed, and then, depress the accelerator pedal 31 again to obtain an appropriate accelerator opening degree which is smaller than the original accelerator opening degree.

The case 4 is a case in which the host vehicle speed Ve is excessively smaller than the speed Vof of the preceding vehicle Mf and the speed Vob of the following vehicle Mb, and the host vehicle M is located slightly forward compared to the target merging relative position Pmt. In this case, a driver needs to greatly depress the accelerator pedal 31 to perform acceleration, and then, gradually return the accelerator pedal 31 to obtain an appropriate accelerator opening degree greater than the original accelerator opening degree.

As described above, even when relative positions between the host vehicle M and other vehicles are the same, a time sequence movement of the required accelerator opening degree is completely different due to a relative speed difference. A driver needs to align a position of the host vehicle M with an appropriate position with respect to the other vehicle upon merging, and needs to set the relative speed with respect to the other vehicle almost to zero. That is, a driver must adjust two elements (a position and a speed) at the same time. For this reason, merging may be a particularly difficult operation for beginners and drivers who are not good at driving.

Figure 4:
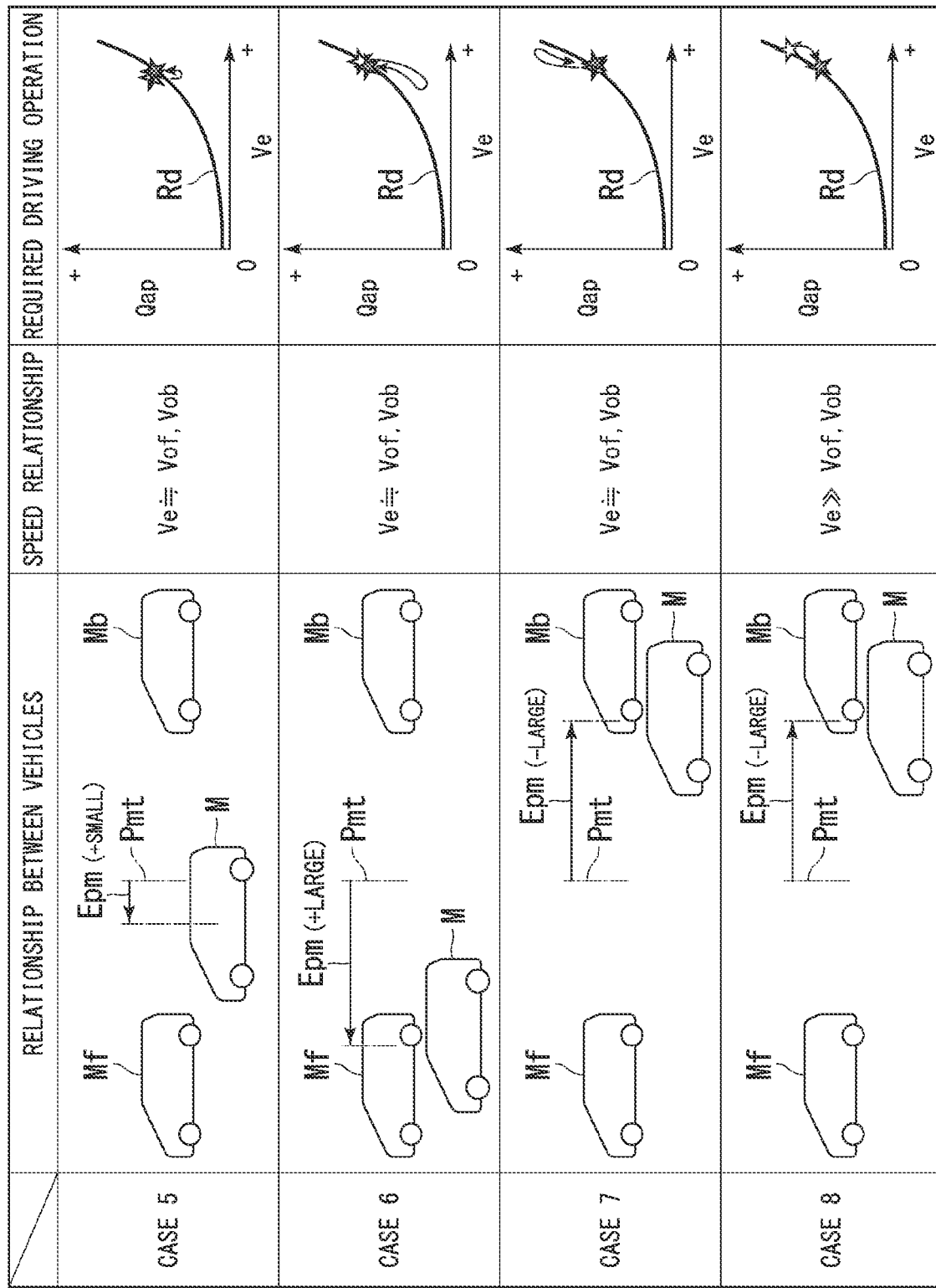
FIG. 4 is a view showing several situations (case 5 to 8) in another point of view related to merging.

FIG. 4 is a view showing several situations (cases 5 to 8) in another point of view related to merging. The cases 5 to 8 are classifications focusing on a difference in positional relationship between the host vehicle M and another vehicle.

Like the case 1, the case 5 is a case in which the host vehicle speed Ve is substantially the same as the speed Vof of the preceding vehicle Mf and the speed Vob of the following vehicle Mb (a relative speed is almost zero), and the host vehicle M is located slightly forward compared to the target merging relative position Pmt. In this case, a driver needs to slightly return the accelerator pedal 31 to perform deceleration, and then, depress the accelerator pedal 31 again to obtain the original accelerator opening degree.

The case 6 is a case in which the host vehicle speed Ve is substantially the same as the speed Vof of the preceding vehicle Mf and the speed Vob of the following vehicle Mb (a relative speed is almost zero), and the host vehicle M is located greatly forward compared to the target merging relative position Pmt. In this case, a driver needs to greatly return the accelerator pedal 31 to perform deceleration, and depress the accelerator pedal 31 again to obtain the original accelerator opening degree while allowing the preceding vehicle Mf to go forward.

The case 7 is a case in which the host vehicle speed Ve is substantially the same as the speed Vof of the preceding vehicle Mf and the speed Vob of the following vehicle Mb (a relative speed is almost zero), and the host vehicle M is disposed greatly rearward compared to the target merging relative position Pmt. In this case, a driver needs to depress the accelerator pedal 31 to perform acceleration, and then, gradually return the accelerator pedal 31 to obtain the original accelerator opening degree.

The case 8 is a case in which the host vehicle speed Ve is excessively greater than the speed Vof of the preceding vehicle Mf and the speed Vob of the following vehicle Mb, and the host vehicle M is located greatly rearward compared to the target merging relative position Pmt. In this case, while the host vehicle position is disposed behind the target merging relative position Pmt, in order to suppress the excessive speed, a driver needs to align the host vehicle position with the target merging relative position Pmt while returning the accelerator pedal 31, and obtain an accelerator opening degree greater than the original accelerator opening degree.

As described above, even when the relative speed between the host vehicle M and the other vehicle is the same, a time sequence movement of the required accelerator opening degree is completely different due to a relative position difference. Even in this case, a driver needs to align a position of the host vehicle M with an appropriate position with respect to other vehicle upon merging, and also needs to set the relative speed with respect to the other vehicle to almost zero. For example, like the case 8, even when the host vehicle M is located behind the target merging relative position Pmt, in some cases, the accelerator pedal 31 must be returned contrary to the feeling of position control. From this point of view, merging may be a particularly difficult operation for beginners and drivers who are not good at driving.

[3. Configuration of Driving Assistance Device]

Figure 5:
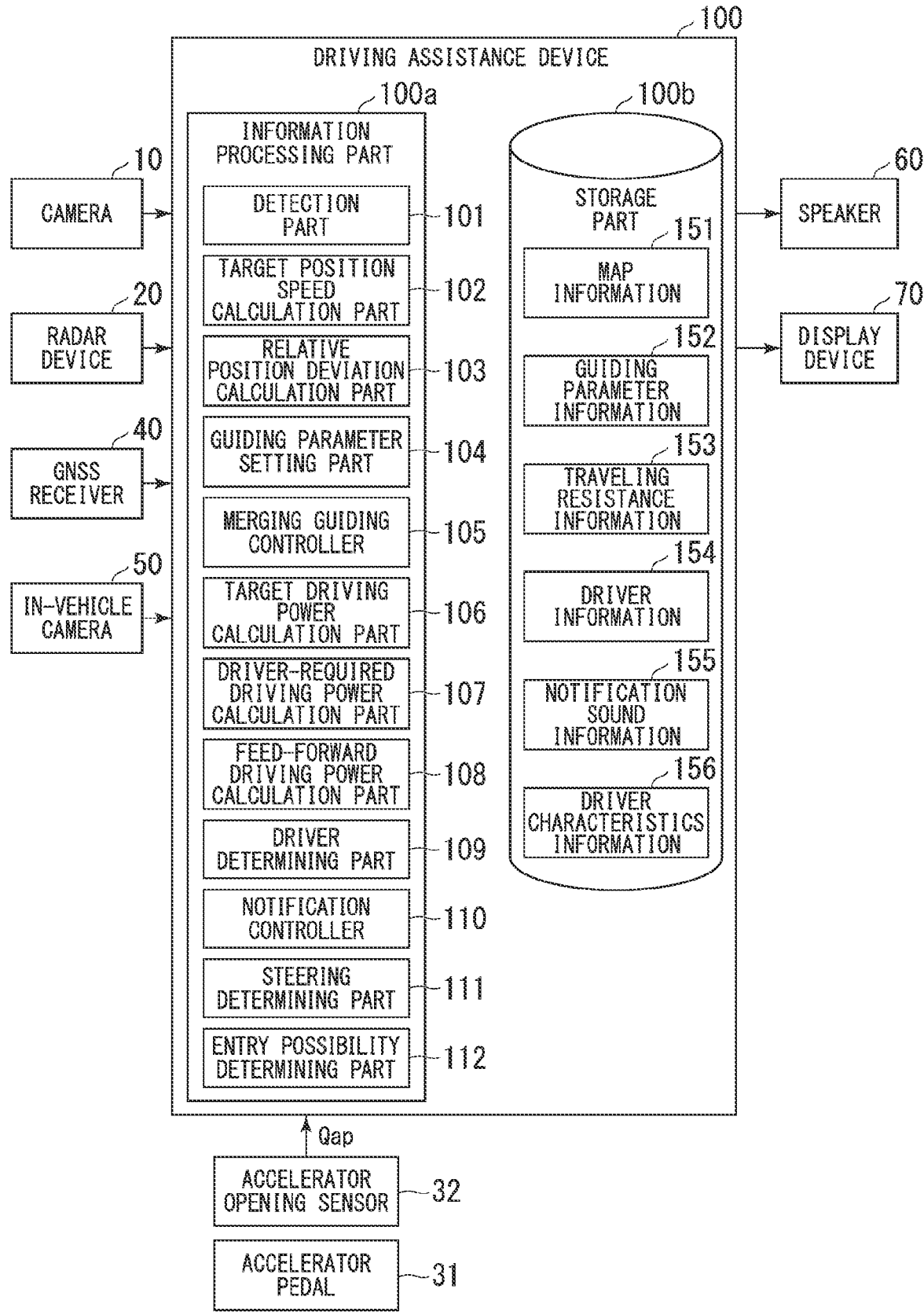
FIG. 5 is a configuration view showing a driving assistance device.

FIG. 5 is a configuration view showing the driving assistance device 100. The vehicle M has a GNSS receiver 40, an in-vehicle camera 50, the speaker 60, and a display device 70, in addition to the above-mentioned configuration.

The GNSS receiver 40 measures a position of the host vehicle M on the basis of radio waves reaching from a GNSS satellite (for example, a GPS satellite). The GNSS receiver 40 outputs the measurement result to the driving assistance device 100.

The in-vehicle camera 50 is provided in a passenger compartment of the vehicle M and can photograph a driver. The in-vehicle camera 50 is an example of "a driver information detection device" configured to detect information in order to identify a driver. "The driver information detection device" may be a microphone configured to collect a driver's voice, a device configured to detect bio information (for example, fingerprint) of the driver, or the like, instead of/in addition to the in-vehicle camera 50.

The speaker 60 is provided in the passenger compartment of the vehicle M, and for example, can output a guiding notification sound or the like to the driver. The display device 70 is a display part or a head-up display (HUD) provided in a meter, and can display predetermined information to the driver. These contents will be described below in detail.

As shown in FIG. 5, the driving assistance device 100 includes an information processing part 100a and a storage part 100b. The information processing part 100a includes, for example, a detection part 101, a target position speed calculation part 102, a relative position deviation calculation part 103, a guiding parameter setting part 104, a merging guiding controller 105, a target driving power calculation part 106, a driver-required driving power calculation part 107, a feed-forward driving power calculation part 108, a driver determining part 109, a notification controller 110, a steering determining part 111, and an entry possibility determining part 112. These components are realized by executing a program (software) using a hardware processor such as a central processing unit (CPU) or the like. Some or all of these components may be realized by hardware (a circuit part; including circuitry) such as large scale integration (LSI), an application specific integrated circuit (ASIC), a field-programmable gate array (FPGA), a graphics processing unit (GPU), or the like, or may be realized by cooperation of software and hardware. The program may be previously stored in a storage device (a storage device including a non-transient storage medium) such as an HDD, a flash memory, or the like, may be stored in a detachable storage medium (a non-transient storage medium) such as a DVD, a CD-ROM, or the like, or may be installed in a storage device as a storage medium is mounted in a drive device.

The storage part 100b is an HDD, a flash memory, a ROM, a random access memory (RAM), or the like. Map information 151, guiding parameter information 152, traveling resistance information (traveling resistance table) 153, driver information 154, notification sound information (sound table) 155, and driver characteristics information 156 are stored in the storage part 100b.

[4. Recommendation of Merging Position]

Next, processing performed before output of a guiding notification sound, which will be described below, will be described. The driving assistance device 100 of the embodiment performs the following processing when an input of a user who wants guidance for merging (for example, an input by a voice such as "start guidance of merging" with respect to an in-vehicle microphone) is received. First, the driving assistance device 100 specifies a merging-possible position based on a detection result of another vehicle detected by the detection part 101, which will be described below, and informs a driver of the specified merging-possible position. While informing the driver is performed by, for example, displaying the merging-possible position on the display device 70, another means may be used. After that, the driver causes the host vehicle M to enter a guiding start range GR (see FIG. 15A, FIG. 15B and FIG. 15C), which will be described below, by performing driving himself or herself. The driving assistance device 100 starts guidance by the guiding notification sound, which will be described below, when the host vehicle M enters the guiding start range GR.

[4. Guidance by Guiding Notification Sound]

[4.1 Basic Processing Related to Guiding Notification Sound]

Figure 6:
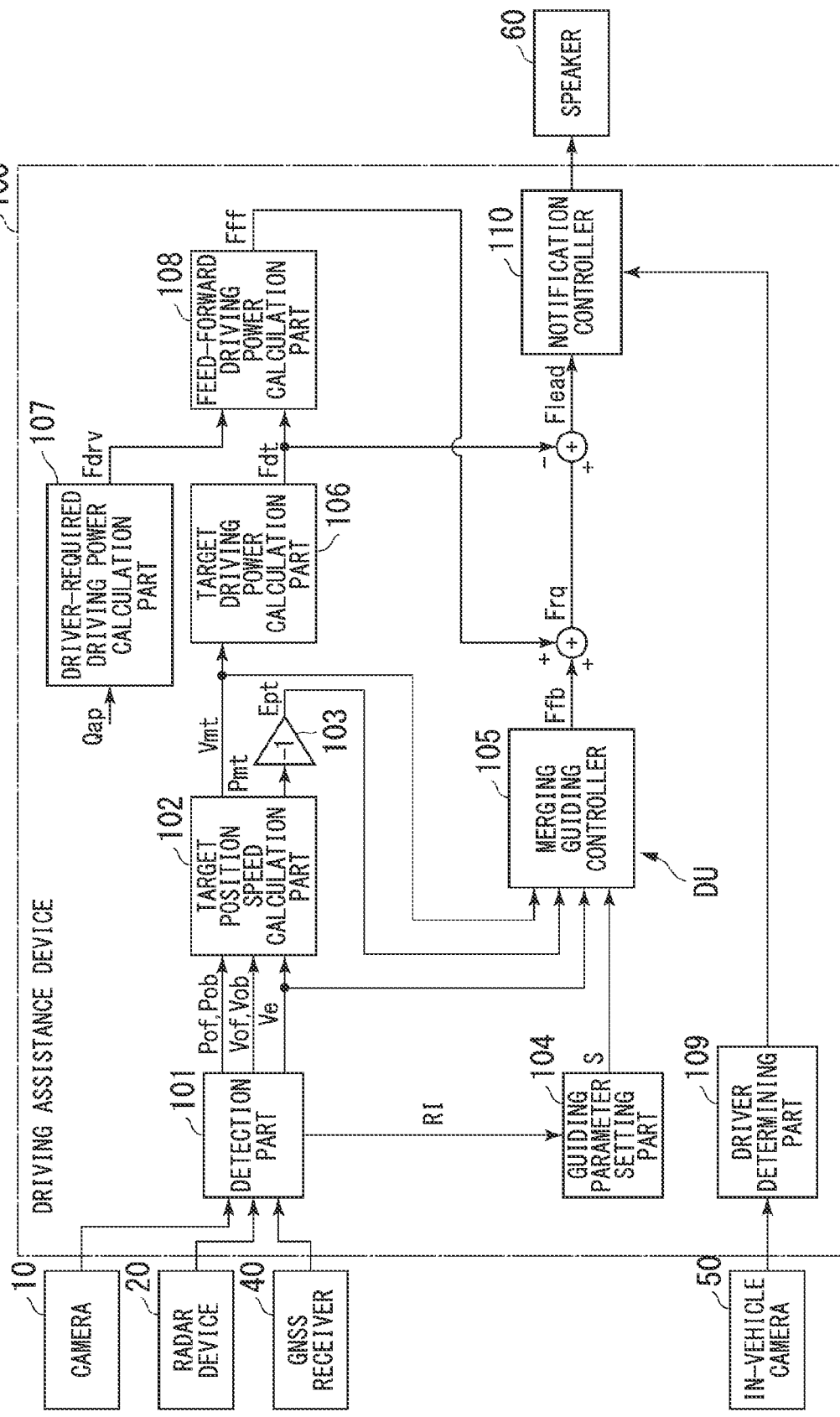
FIG. 6 is a block diagram showing a processing flow related to a guiding notification sound.

FIG. 6 is a block diagram showing a processing flow related to a guiding notification sound. Further, the processing described below is repeatedly executed for each predetermined control time period (for example, 50 [msec] to 300 [msec]). Reference sign "k" in mathematical formulae means a value in a control time k.

The detection part 101 acquires detection results of the camera 10 and the radar devices 20. The detection results of the camera 10 and the radar devices 20 include detection results of other vehicles (the preceding vehicle Mf and the following vehicle Mb) traveling in a movement destination lane that is a merging destination or a lane change destination. The detection part 101 detects a relative position Pof of the preceding vehicle Mf with respect to the host vehicle M, a relative position Pob of the following vehicle Mb with respect to the host vehicle M, a speed Vof of the preceding vehicle Mf, and a speed Vob of the following vehicle Mb based on the detection results of the camera 10 and the radar devices 20, and outputs the detected relative positions Pof and Pob and speeds Vof and Vob to the target position speed calculation part 102. The relative positions Pof and Pob are specified by, for example, a relative coordinate system with reference to the host vehicle M. Further, the detection part 101 detects the host vehicle speed Ve based on the detection results of the sensors provided on a traveling device and the like of the host vehicle M. The detection part 101 outputs the detected host vehicle speed Ve to the target position speed calculation part 102 and the merging guiding controller 105.

In the embodiment, the detection part 101 derives traveling road information RI based on the detection result of the camera 10 (for example, image data acquired by the camera 10), and outputs the derived traveling road information RI to the guiding parameter setting part 104. The traveling road information RI is information indicating a shape of a lane in which the host vehicle M travels, and includes information indicating a distance that can be used in merging. Further, the detection part 101 may derive the traveling road information RI based on the detection result of the GNSS receiver 40 and the map information 151 stored in a storage part 10b, in addition to/instead of the detection result of the camera 10. The map information 151 is information showing types of lanes (types such as a main lane, a merging lane, a passing lane, an uphill lane, and the like), or a distance of the lane (a length or the like of the merging lane).

The target position speed calculation part 102 calculates the target merging relative position Pmt based on the relative positions Pof and Pob. The target position speed calculation part 102 calculates, for example, a central position between the relative position Pof and the relative position Pob in the advancing direction of the vehicle as the target merging relative position Pmt. Instead of this, the target position speed calculation part 102 may calculate a position forward by a predetermined amount (or a predetermined proportion) with respect to the central position between the relative position Pof and the relative position Pob in the advancing direction of the vehicle as the target merging relative position Pmt. The target merging relative position Pmt is a target relative position with respect to another vehicle (for example, the preceding vehicle Mf) to enter the movement destination lane. The target merging relative position Pmt is calculated by, for example, a relative coordinate system with reference to the host vehicle M. The target position speed calculation part 102 outputs the calculated target merging relative position Pmt to the relative position deviation calculation part 103.

Further, the target position speed calculation part 102 calculates a target merging speed Vmt that is a target speed for merging based on the speeds Vof and Vob. For example, the target position speed calculation part 102 calculates the same speed as the speed Vof of the preceding vehicle Mf as the target merging speed Vmt. Instead of this, the target position speed calculation part 102 may calculate a median value between the speeds Vof and Vob as the target merging speed Vmt when the speed Vob of the following vehicle Mb is greater than the speed Vof of the preceding vehicle Mf. The target position speed calculation part 102 outputs the calculated target merging speed Vmt to the target driving power calculation part 106. The target position speed calculation part 102 is an example of "a determining part" configured to determine the target merging relative position Pmt and the target merging speed Vmt.

The relative position deviation calculation part 103 calculates a relative position deviation Ept based on the target merging relative position Pmt. The relative position deviation Ept has substantially the same meaning as the above-mentioned relative positional error Epm. The relative position deviation Ept is calculated by, for example, a relative coordinate system with reference to the host vehicle M. In this case, the relative position deviation Ept is calculated by multiplying the target merging relative position Pmt by "−1." That is, the relative position deviation calculation part 103 calculates the relative position deviation Ept based on the following Equation (1). The relative position deviation calculation part 103 outputs the calculated relative position deviation Ept to the merging guiding controller 105.

[Math. 1]

$$Ept(k)=-Pmt(k) \quad (1)$$

The guiding parameter setting part 104 sets a merging guiding parameter S (0<S) for each merging situation based on the traveling road information RI and the guiding parameter information 152 stored in the storage part 100b. The guiding parameter information 152 is information indicating a correspondence relationship between a distance usable in merging and the merging guiding parameter S. The merging guiding parameter S is a parameter used for calculation of guidance feedback driving power Ffb in the merging guiding controller 105, which will be described below. As the merging guiding parameter S increases, tolerance of acceleration/deceleration upon merging increases. When the guidance feedback driving power Ffb is calculated in consideration of the merging guiding parameter S, the guiding notification sound is changed according to the distance usable in merging.

Figure 7:
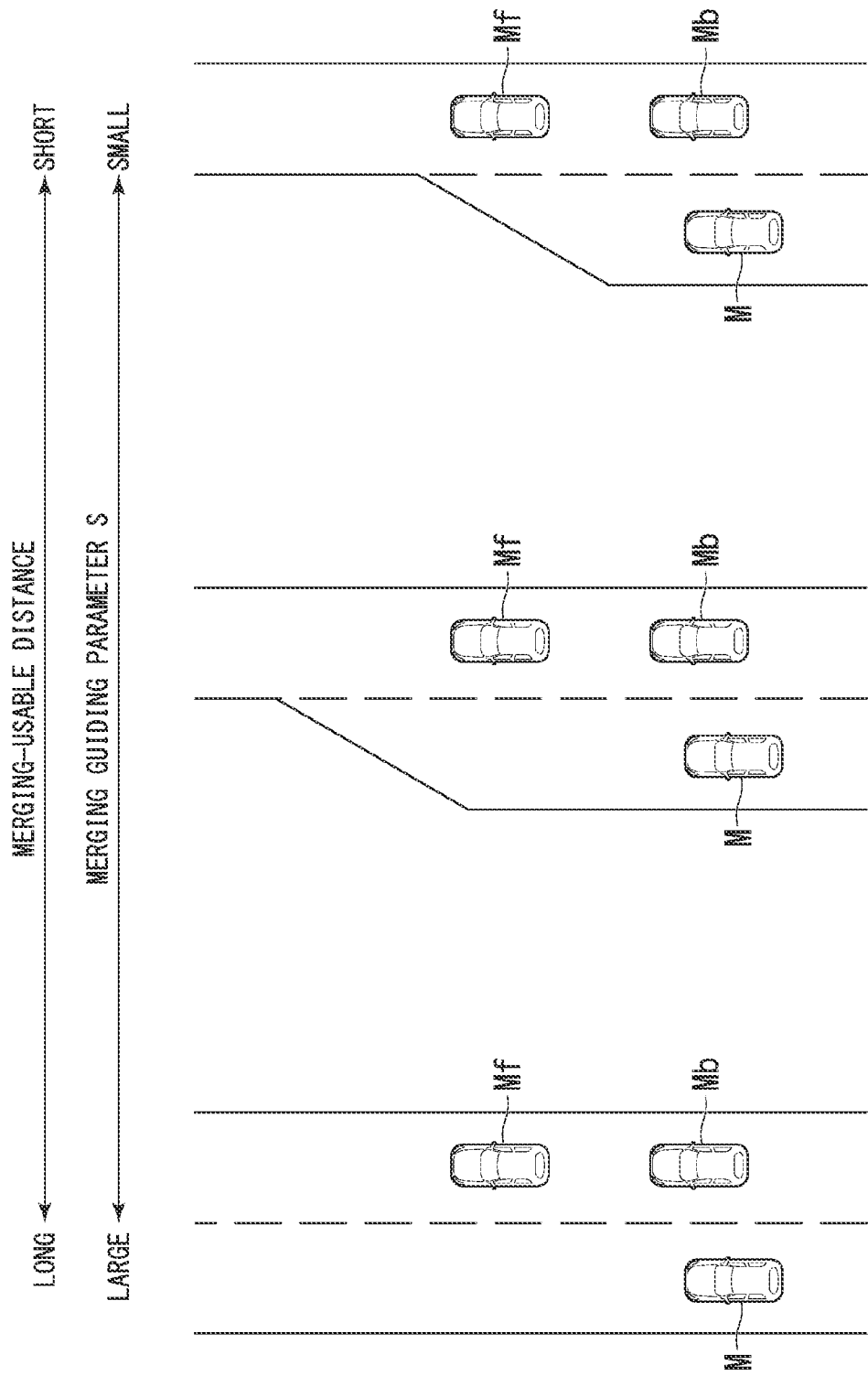
FIG. 7 is a view conceptually showing setting of a merging guiding parameter.

FIG. 7 is a view conceptually showing setting of the merging guiding parameter S. The guiding parameter setting part 104 sets a larger merging guiding parameter S when the distance that can be used in merging is longer, and sets a smaller merging guiding parameter S when the distance that can be used in merging is shorter, based on the traveling road information RI. The guiding parameter setting part 104 outputs the set merging guiding parameter S to the merging guiding controller 105. The merging guiding parameter S is a parameter that increases the tolerance of the acceleration/deceleration upon merging as it gets smaller. That is, as the merging guiding parameter S is smaller, an inclination of a switching function a (FIG. 8), which will be described below, becomes steeper, and it becomes a situation in which a position of the host vehicle M is matched with the target merging position at a short time while the large deviation between the target merging speed and the speed of the host vehicle M remains.

Next, returning to FIG. 6, the merging guiding controller (the guidance feedback driving power calculation part) 105 will be described. The merging guiding controller 105 calculates the guidance feedback driving power Ffb based on the target merging speed Vmt, the relative position deviation Ept, the host vehicle speed Ve, and the merging guiding parameter S.

Figure 8:
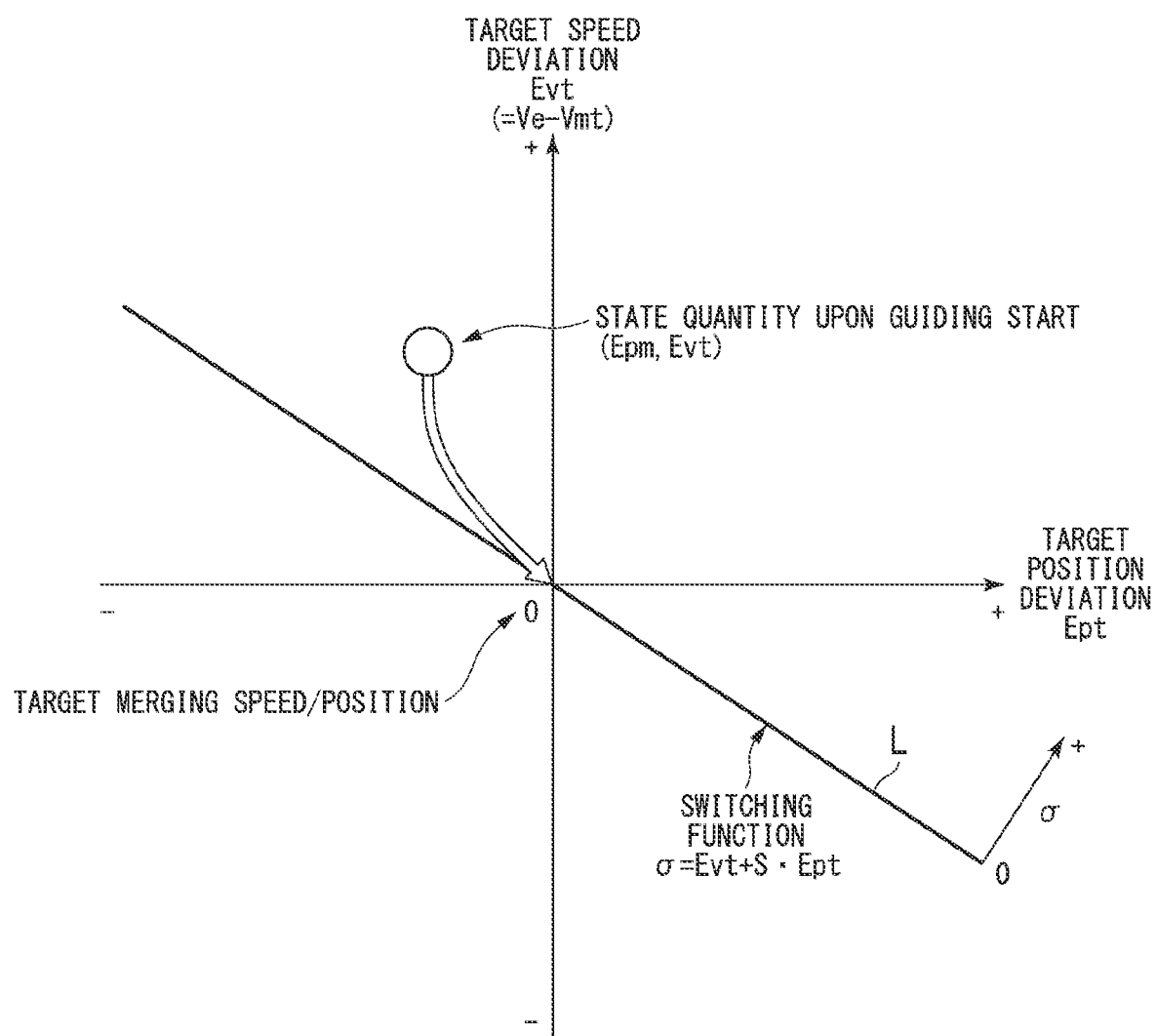
FIG. 8 is a view conceptually showing calculation of a merging guiding controller.

FIG. 8 is a view conceptually showing calculation by the merging guiding controller 105. The merging guiding controller 105 first calculates a target speed deviation Evt based on the target merging speed Vmt and the host vehicle speed Ve. Specifically, the target speed deviation Evt is calculated based on the following Equation (2).

[Math. 2]

$$Evt(k)=Ve(k)-Vmt(k) \quad (2)$$

Then, the merging guiding controller 105 calculates the guidance feedback driving power Ffb to cause both the relative position deviation Ept and the target speed deviation Evt to simultaneously converge to zero. The merging guiding controller 105 of the embodiment calculates the guidance feedback driving power Ffb to cause both the relative position deviation Ept and the target speed deviation Evt to simultaneously converge to zero based on the response designated control (Pole-assignment control, for example, sliding mode control, back-stepping control, or the like). That is, the merging guiding controller 105 calculates the guidance feedback driving power Ffb that brings both the relative position deviation Ept and the target speed deviation Evt closer to a straight line L on which the switching function σ=Evt+S×Ept becomes zero at the same time (for example, brings them closer through exponential attenuation).

Specifically, the guidance feedback driving power Ffb is calculated based on the following Equations (3) to (6). Here, S designates a merging guiding parameter, Ept designates a target position deviation, Evt designates a target speed deviation, Ve designates a host vehicle speed, Vmt designates a target merging speed, Pmt designates a target relative merging position, k designates a control time (control cycle), Ffb designates a guidance feedback driving power, Ffb_rch designates a reach rule input, Ffb_adp designates an adaptive rule input, and Krch and Kadp designate feedback gains.

[Math. 3]

$$\sigma(k) = Ept(k) + S(k)Evt(k) \quad (3)$$

[Math. 4]

$$Ffb\_rch(k) = Krch\sigma(k) \quad (4)$$

[Math. 5]

$$Ffb\_adp(k) = \begin{cases} Ffb\_adp(k-1) + Kadp\ \sigma(k) & \text{(When executing guidance)} \\ -Krch\ \sigma(k) & \text{(When not executing guidance)} \end{cases} \quad (5)$$

[Math. 6]

$$Ffb(k) = Ffb\_rch(k) + Ffb\_adp(k) \quad (6)$$

According to the above-mentioned calculation, the merging guiding controller 105 calculates time sequence driving power data that can converge to the target merging position/speed.

Figure 9:
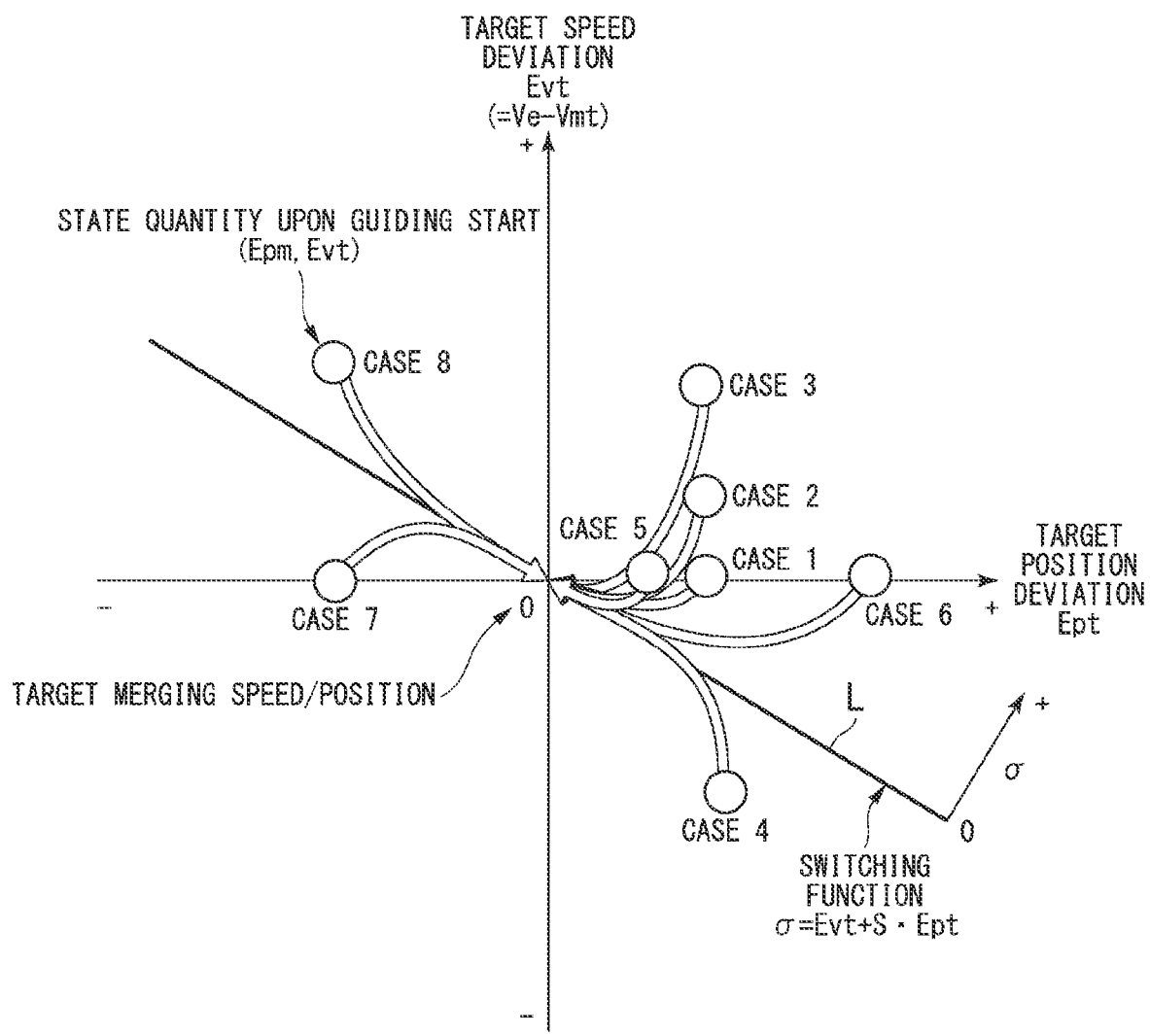
FIG. 9 is a view conceptually showing a case in which response designated control is used for the cases 1 to 8.

FIG. 9 is a view conceptually showing a case in which response designated control is used for the above-mentioned cases 1 to 8. As the response designated control is used, in any merging situation, an ideal acceleration/deceleration behavior of the vehicle M can be expressed. Further, calculation of the driving power upon merging is not limited to the response designated control, and may be another type of control such as cascade control or the like.

Next, returning to FIG. 6, the remaining configuration will be described. The target driving power calculation part 106 calculates a driving power Fdt upon target merging of the host vehicle M based on the target merging speed Vmt and the traveling resistance information 153 stored in a storage part 101b. That is, the target driving power calculation part 106 calculates a driving power upon merging required to realize the target merging speed Vmt by referring to the traveling resistance information 153 as the driving power Fdt upon target merging. The traveling resistance information 153 is information indicating a correspondence relationship between the host vehicle speed Ve and the driving power (the accelerator opening Qap) required to realize the host vehicle speed Ve as shown in FIG. 2. The target driving power calculation part 106 outputs the calculated driving power Fdt upon target merging to the feed-forward driving power calculation part 108.

The accelerator opening Qap that is a detection result of the accelerator opening sensor 32 is input to the driver-required driving power calculation part 107. The driver-required driving power calculation part 107 calculates a driving power Fdrv of the host vehicle M corresponding to the input accelerator opening Qap (hereinafter referred to as "a driver-required driving power Fdrv") based on the input accelerator opening Qap and, for example, a previously registered mathematical formula for conversion. The driver-required driving power calculation part 107 outputs the calculated driver-required driving power Fdrv to the feed-forward driving power calculation part 108.

The feed-forward driving power calculation part 108 calculates a feed-forward driving power Fff based on the driver-required driving power Fdrv and the driving power Fdt upon target merging. The feed-forward driving power calculation part 108 calculates the feed-forward driving power Fff based on, for example, a model that smoothly connects the driver-required driving power Fdrv and the driving power Fdt upon target merging (connects with a ramp).

The feed-forward driving power Fff calculated by the feed-forward driving power calculation part 108 is added to the guidance feedback driving power Ffb calculated by the merging guiding controller 105. Accordingly, a required driving power Frq is calculated. Then, when the driving power Fdt upon target merging is subtracted from the required driving power Frq, a guiding parameter (guidance driving power) Flead is calculated. That is, the guiding parameter Flead is calculated as a difference from the driving power that becomes a target merging speed upon merging. When the host vehicle M is maintained at a target speed, the guiding parameter Flead becomes zero. The calculated guiding parameter Flead is output to the notification controller 110.

As described above, in the embodiment, an example of "a deriving part DU" is configured by the merging guiding controller 105, the target driving power calculation part 106, the driver-required driving power calculation part 107, and the feed-forward driving power calculation part 108. The deriving part DU derives a driving power that causes a position and a speed of the host vehicle M to simultaneously converge to the target merging relative position Pmt and the target merging speed Vmt based on the response designated control. Here, "deriving" as used herein is not limited to calculating, and also includes a case in which a value is acquired by referring to a table or the like. In other words, a term such as "calculating" in the description of the function parts may be appropriately read as "deriving."

The detection result (photographed result) of the in-vehicle camera 50 is input to the driver determining part 109. The driver determining part 109 determines a driver who drives the host vehicle M based on the detection result of the in-vehicle camera 50 and the driver information 154 stored in the storage part 101b. The driver information 154 is information used to determine a driver (identify a driver) based on the detection result of the in-vehicle camera 50. For example, the driver information 154 is information indicating a correspondence relationship between the detection result of the in-vehicle camera 50 and an identification ID of the driver. The information (a driver ID) indicating the determined driver is output to the notification controller 110.

The notification controller 110 specifies (determines) a type of a guiding notification sound (a tone height, a sound quality, a sound volume, an interval, or the like) that guides a driver upon merging based on the guiding parameter Flead, and outputs the specified (determined) guiding notification sound from the speaker 60. The guiding notification sound is a notification sound that assists the driver to match the speed of the host vehicle M with the target merging speed Vmt and assists the driver in aligning a position in the advancing direction of the host vehicle M with respect to the target merging relative position Pmt.

Figure 10:
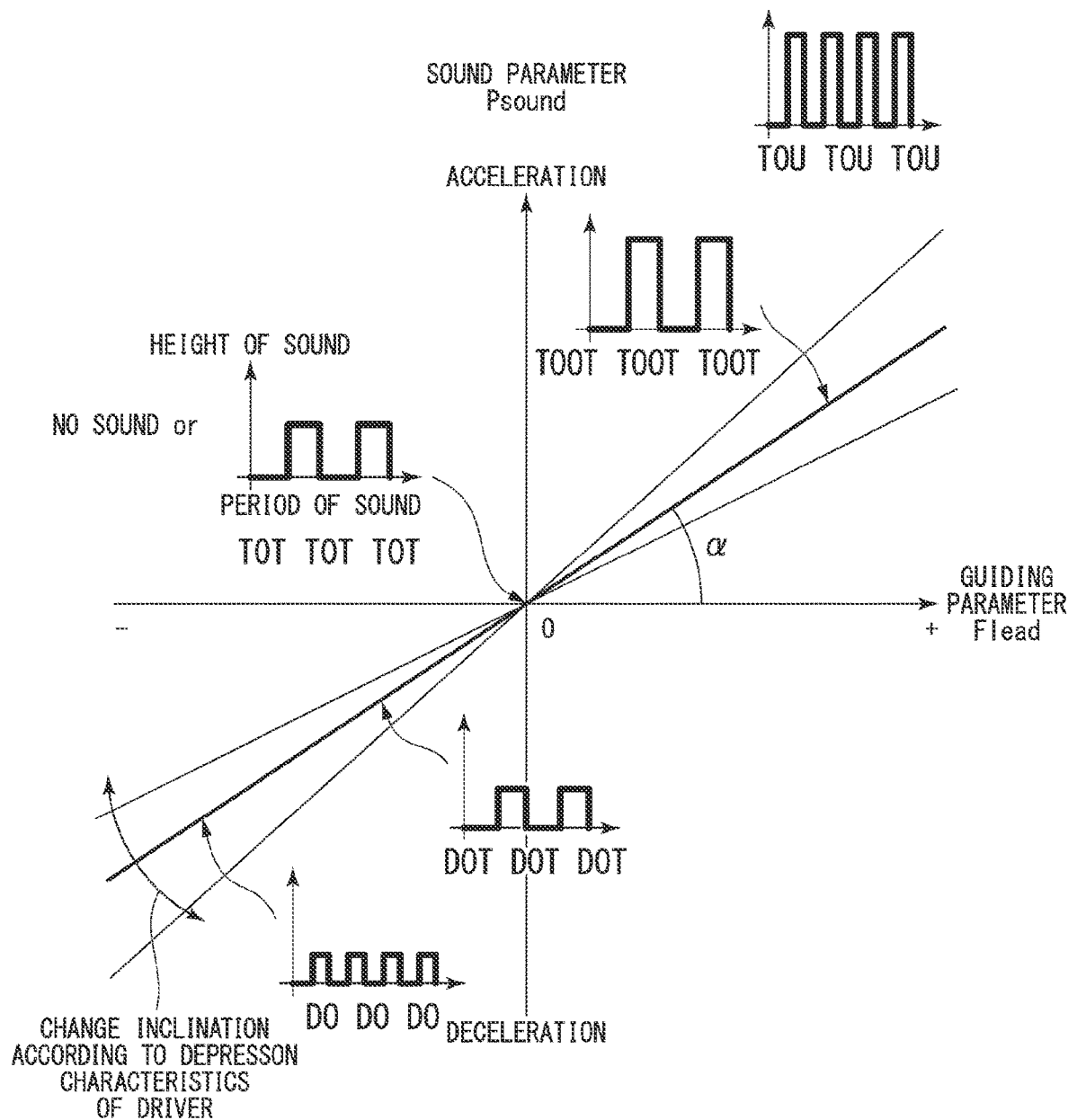
FIG. 10 is a view conceptually showing a guiding notification sound output from a notification controller.

FIG. 10 is a view conceptually showing a guiding notification sound output from the notification controller 110. In the embodiment, the notification controller 110 outputs a guiding notification sound that differs in a case the host vehicle M requires acceleration or in a case the host vehicle M requires deceleration in order to perform alignment of the advancing direction of the vehicle with respect to the target merging relative position Pmt from the speaker 60.

For example, the notification controller 110 outputs from the speaker 60 a notification sound with a tone height that differs in a case acceleration is required and in a case deceleration is required. In the embodiment, the notification controller 110 outputs from the speaker 60 the guiding notification sound having a higher tone height when acceleration is required compared to when deceleration is required. That is, the notification controller 110 outputs a notification sound having a high tone height (for example, "toot toot toot") when acceleration is required, and outputs a notification sound having a low tone height (for example, "do do do") when deceleration is required.

In the embodiment, the notification controller 110 makes the interval of the guiding notification sound (a period of making a notification sound) different according to a speed variation degree (a necessary degree of acceleration/a necessary degree of deceleration) required by the host vehicle M in order to perform the alignment. For example, the notification controller 110 makes an interval of the guiding notification sound shorter as the necessary degree of acceleration increases as the speed variation degree, and makes an interval of the guiding notification sound shorter as the necessary degree of deceleration increases as the speed variation degree.

The notification controller 110 may have different tone heights, sound volumes, or tone colors of the guiding notification sound according to the speed variation degree required by the host vehicle M to perform the alignment instead of/in addition to the interval of the guiding notification sound. For example, the notification controller 110 may make a tone height of guiding notification sound higher as the necessary degree of acceleration increases as the speed variation degree, and may make a tone height of the guiding notification sound lower as the necessary degree of deceleration increases as the speed variation degree. For example, the notification controller 110 may increase a sound volume of the guiding notification sound as the necessary degree of acceleration increases as the speed variation degree, and may increase a sound volume of the guiding notification sound as the necessary degree of deceleration increases as the speed variation degree.

In other words, the notification controller 110 of the embodiment changes one or more elements of the tone height, the sound volume, the tone color, and the interval of the guiding notification sound according to whether the host vehicle M requires acceleration or deceleration in order to perform the alignment, and changes another one or more elements of the tone height, the sound volume, the tone color, and the interval of the guiding notification sound according to a speed variation degree required by the host vehicle M in order to perform the alignment.

In the embodiment, the notification controller 110 outputs the guiding notification sound indicating that there is no need for acceleration or deceleration (a neutral guiding notification sound) when there is no need for acceleration or deceleration in order to perform the alignment from the speaker 60. For example, a tone height of the neutral guiding notification sound is set between the tone height of the guiding notification sound in a case acceleration is required and the tone height of the guiding notification sound in a case deceleration is required. For example, the interval of the neutral guiding notification sound is set to be greater than the interval of the guiding notification sound when acceleration is required, and set to be greater than the interval of the guiding notification sound when deceleration is required. Instead of this, the notification controller 110 may prevent the guiding notification sound from being output from the speaker 60 when acceleration and deceleration are not required to perform the alignment.

More specifically, the notification controller 110 of the embodiment performs the following processing. That is, the notification controller 110 specifies a sound parameter Psound based on the guiding parameter Flead and a driver characteristic parameter (hereinafter referred to as "an inclination α" for convenience of description), which will be described below. Specification of the sound parameter Psound is performed using, for example, a previously set conversion type, a table, or the like. Then, the notification controller 110 refers to the notification sound information 155, and specifies components (a tone height, a sound volume, a tone color, and an interval) of the guiding notification sound corresponding to the specified sound parameter Psound. Then, the notification controller 110 outputs the specified guiding notification sound from the speaker 60 by controlling the speaker 60 based on the components (the tone height, the sound volume, the tone color, and the interval) of the specified guiding notification sound.

In other words, the above-mentioned phrase "outputting the guiding notification sound that differs when the host vehicle M requires acceleration and when the host vehicle M requires deceleration from the speaker 60" also includes a case of specifying (for example, selecting) the guiding notification sound to be output based on the input guiding parameter Flead and outputting the specified guiding notification sound from the speaker 60 without performing determination processing of whether "acceleration is required" or "deceleration is required" using the notification controller 110.

FIG. 11 is a view conceptually showing an example of the notification sound information 155. In the notification sound information 155, for example, the sound parameter Psound, the tone height of the guiding notification sound, and the interval (period) of the guiding notification sound are registered in association. The notification controller 110 acquires the tone height and the period of the guiding notification sound corresponding to the sound parameter Psound by referring to the notification sound information 155. In the example shown in FIG. 11, the tone height is set to three stages of "when acceleration is required," "when neither acceleration nor deceleration is required" and "when deceleration is required." Meanwhile, a period of a sound is set such that the period "when neither acceleration nor deceleration is required" is longest, and the period decreases as the necessary degree of acceleration increases or the necessary degree of deceleration increases.

FIG. 12 is a view conceptually showing another example of the notification sound information 155. In the example shown in FIG. 12, the tone height is registered such that the tone height gets higher as the necessary degree of acceleration increases, and gets lower as the necessary degree of deceleration increases while having the tone height "when neither acceleration nor deceleration is required" at the center

[4.2 Change of Inclination α According to Driver Characteristics]

Next, a change of the inclination a according to the driver characteristics will be described. For example, even when the same guiding notification sound is heard, the depression amount of the accelerator pedal 31 may differ greatly depending on the driver. Here, the notification controller 110 changes (adjusts) the guiding notification sound according to the depression characteristics of each driver with respect to the accelerator pedal 31. That is, the notification controller 110 changes setting of the inclination α for each driver such that the driver depresses the accelerator pedal 31 to a depression amount at which the required driving power is obtained.

Figure 13:
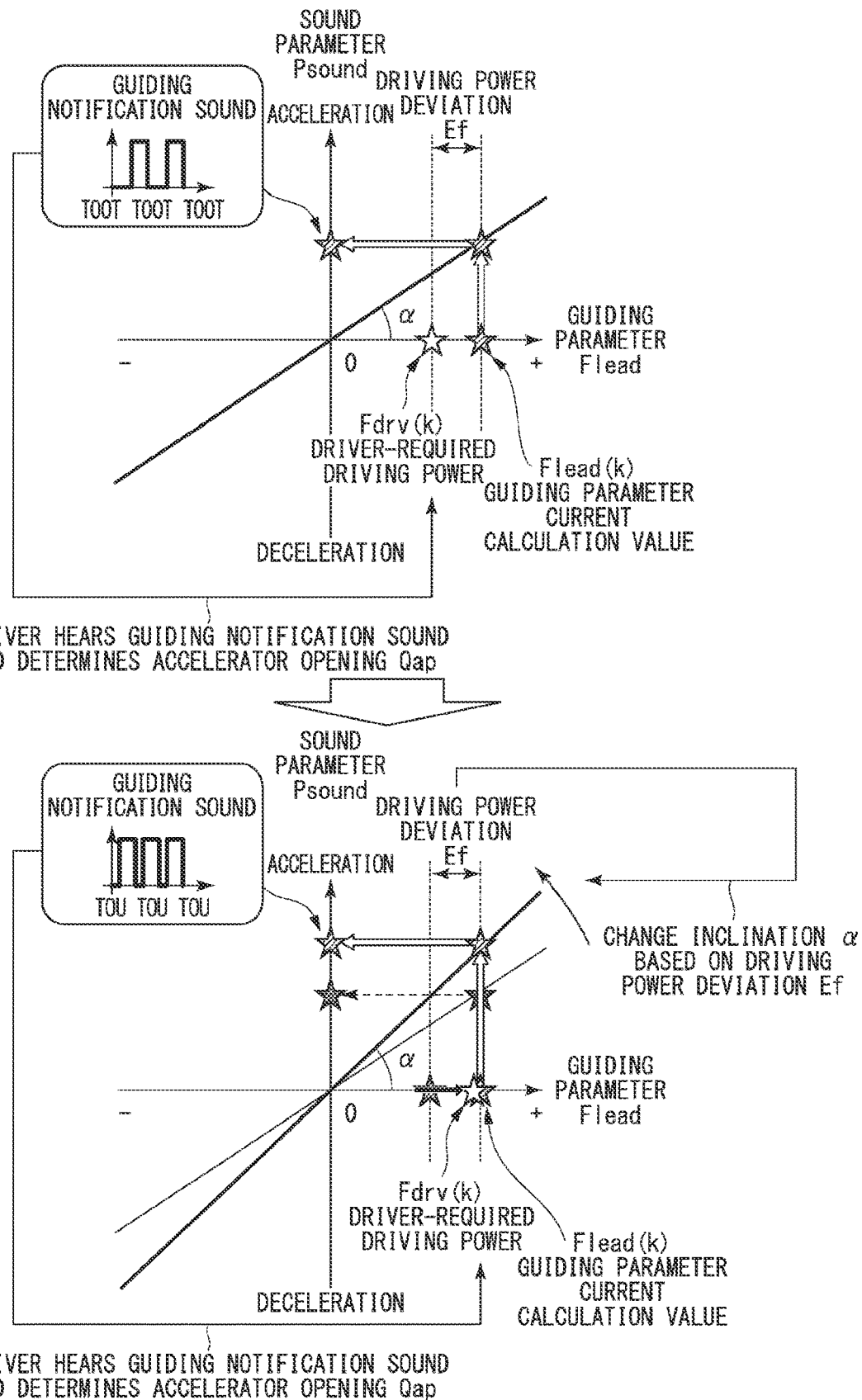
FIG. 13 is a view conceptually showing a change of inclination.

FIG. 13 is a view conceptually showing a change of the inclination α. The notification controller 110 first specifies the sound parameter Psound based on the current calculating value (for example, an initial value) of the guiding parameter Flead, and outputs the guiding notification sound corresponding to the specified sound parameter Psound. As a result, the driver displaces the accelerator pedal 31 in response to the guiding notification sound.

Next, the driver-required driving power calculation part 107 calculates the driver-required driving power Fdrv after response to the guiding notification sound based on the accelerator opening Qap most recently of the accelerator pedal 31, and outputs the calculated driver-required driving power Fdrv to the notification controller 110. Then, the notification controller 110 compares a difference between the received driver-required driving power Fdrv and the driving power Fdt and the guiding parameter Flead, and determines whether a driving power deviation Ef (=Fdrv−Fdt−Flead), which is a difference of the guiding parameter Flead with respect to the difference between the driver-required driving power Fdrv and the driving power Fdt, is present or not.

The notification controller 110 changes the inclination a to eliminate the driving power deviation Ef when the driving power deviation Ef is present. For example, when the driver-required driving power Fdrv with respect to the current calculating value of the guiding parameter Flead is small, the inclination α is changed such that the interval of the guiding notification sound is reduced (i.e., becomes the guiding notification sound that requires a higher driving power) even if the same guiding parameter Flead is input. The notification controller 110 repeats the above-mentioned change processing (adjustment processing) of the inclination a for every predetermined period. Accordingly, the appropriate inclination α is obtained for each driver. The notification controller 110 registers the inclination a obtained for each driver in the driver characteristics information 156 and uses it from the next time onward.

Figures 14, 15A:
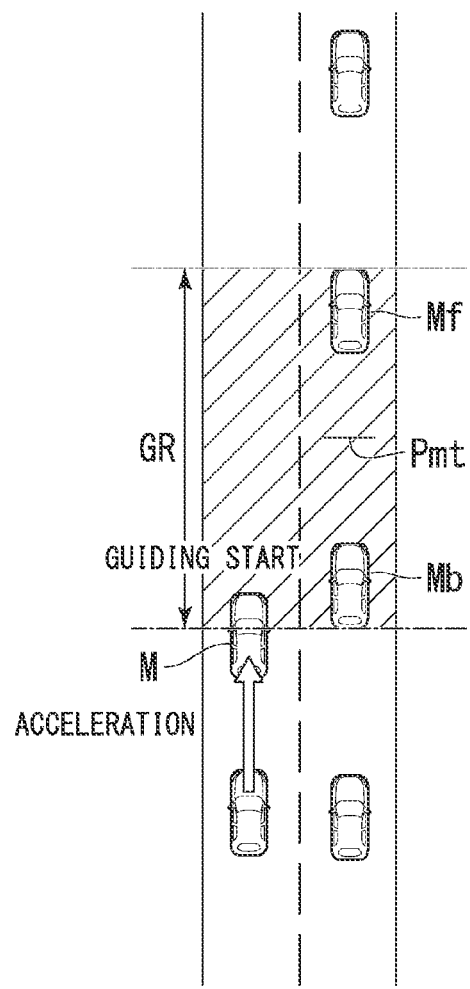
FIG. 14 is a view showing an example of driver characteristics information.
FIG. 15A is a view showing a guiding start range according to a guiding notification sound.

FIG. 14 is a view showing an example of the driver characteristics information 156. In the driver characteristics information 156, the identification ID of the driver and the inclination α obtained for each driver are correspondingly registered. The notification controller 110 reads the inclination a from the driver characteristics information 156 when the inclination α corresponding to the driver ID determined by the driver determining part 109 is registered as the driver characteristics information 156, and calculates the sound parameter Psound using the read inclination α. Accordingly, the guiding notification sound in response to the depression characteristics for each driver can be output.

The change processing of the inclination a in response to the above-mentioned driver characteristics is performed on the basis of the following Equations (7) to (9). Here, Psound is a sound parameter, a is an inclination of the sound parameter, Ef is a driving power deviation, Ksnd is a sound parameter application gain (0<ksnd).

[Math. 7]

$$P\text{sound}(k)=\alpha(k)F\text{lead}(k) \tag{7}$$

[Math. 8]

$$Ef(k)=Fdrv(k)-Fdt(k)-F\text{lead}(k) \tag{8}$$

[Math. 9]

$$\alpha(k) = \begin{cases} \alpha(k-1) - Ksnd\ Ef(k) & \text{(When executing guidance)} \\ \alpha(k-1) & \text{(When not executing guidance)} \end{cases} \tag{9}$$

[5. Another Processing Related to Guiding Notification Sound]

[5.1 Guiding Start Range by Guiding Notification Sound]

Figure 15B:
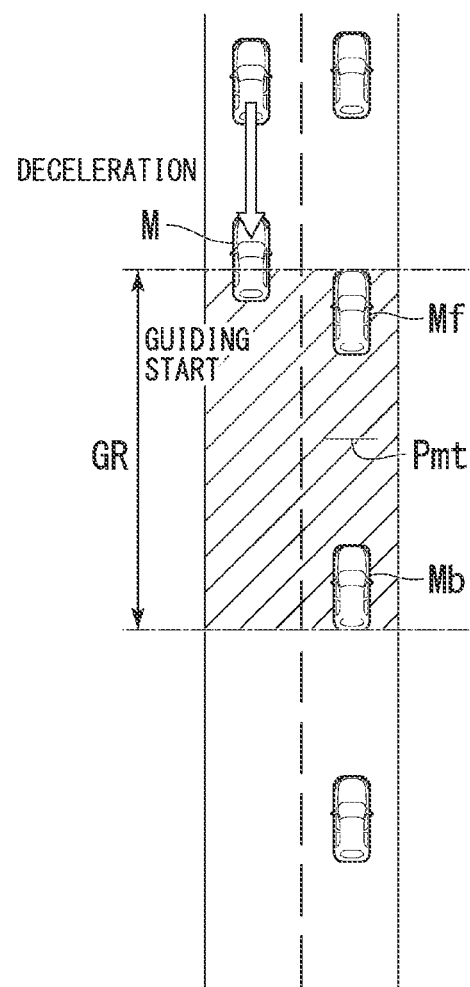
FIG. 15B is a view showing a guiding start range according to a guiding notification sound.
Figure 15C:
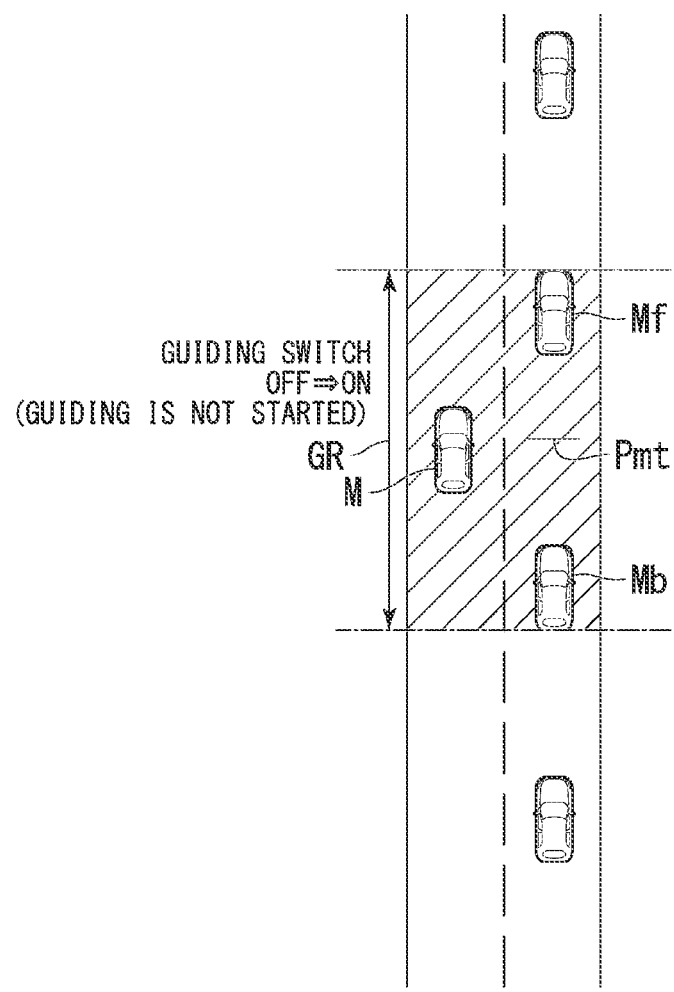
FIG. 15C is a view showing a guiding start range according to a guiding notification sound.

FIG. 15A, FIG. 15B and FIG. 15C are views showing the guiding start range GR by the guiding notification sound. In the embodiment, the notification controller 110 starts output of the guiding notification sound in response to entry of the host vehicle M into the guiding start range GR between the front section (for example, a front end) of the preceding vehicle Mf traveling just in front of the target merging relative position Pmt and a rear section (for example, a rear end) of the following vehicle Mb traveling just behind the target merging relative position Pmt in the advancing direction of the vehicle.

For example, the notification controller 110 starts output of the guiding notification sound when the host vehicle M enters the guiding start range GR from behind as shown in FIG. 15A and when the host vehicle M enters the guiding start range GR from the front as shown in FIG. 15B. This is because in a case in which the host vehicle M is disposed at a side in front of the front section (for example, the front end) of the preceding vehicle Mf or in a case in which the host vehicle M is disposed at a side behind the rear section of the following vehicle Mb, the preceding vehicle Mf and the following vehicle Mb are detected by the detection part 101 in a state in which the preceding vehicle Mf and the following vehicle Mb overlap each other, and therefore, recognition accuracy of the positions or the speeds of the preceding vehicle Mf and the following vehicle Mb is decreased.

Meanwhile, the notification controller 110 does not start output of the guiding notification sound when input from the driver who wants the guide merging is input in a state in which the target merging relative position Pmt is located at a side as shown in FIG. 15C. In this case, the driving assistance device 100 performs a countermeasure of informing the driver that re-entering the guiding start range GR is required, or changes the target merging relative position Pmt. As described above, this is because the host vehicle M of the embodiment may have the dead angle zone DA on the side. Further, if the host vehicle M has a monitoring sensor group that can detect a situation of 360 degrees around, output of the guiding notification sound may be started also from the state shown in FIG. 15C.

[5.2 Output of Guiding Start Notification Sound]

In the embodiment, the notification controller 110 outputs a guiding start notification sound that is different from the guiding notification sound from the speaker 60 prior to the start of the output of the guiding notification sound when the host vehicle M enters the guiding start range GR. The guiding start notification sound may be a voice announcement such as "guidance is started."

[5.3 Output of Steering Instruction Sound]

In the embodiment, the steering determining part 111 determines a steering timing for entering a movement destination lane. The steering determining part 111 determines that a steering timing has arrived, for example when a positional error of the host vehicle M with respect to the target merging relative position Pmt is within a predetermined range and a speed error of the host vehicle M with respect to the target merging speed Vmt is within a predetermined range.

The notification controller 110 outputs a steering instruction sound that is different from the guiding notification sound at a steering timing determined by the steering determining part 111 from the speaker 60. The steering instruction sound may be a specified sound output from the speaker 60 (for example, a sound such as "Pone"), or a voice announcement such as "merging is possible" or "please turn the handle."

[5.4 Output of Guiding Stop Notification Sound]

In the embodiment, the entry possibility determining part 112 determines whether or not to enter the movement destination lane. The entry possibility determining part 112 determines that entry to the movement destination lane is impossible when a predetermined condition is satisfied, for example, when an intervehicular distance between the preceding vehicle Mf and the following vehicle Mb is less than a predetermined value, or the like.

The notification controller 110 outputs the guiding stop notification sound that is different from the guiding notification sound from the speaker 60 when it is determined by the entry possibility determining part 112 that entry to the movement destination lane is impossible after output of the guiding notification sound is started. The guiding stop notification sound may be a specified sound output from the speaker 60 (for example, an alarm sound such as "Buu"), or a voice announcement such as "please stop merging" or "please change to behind of the following vehicle."

[6. Control Flow]

Figure 16:
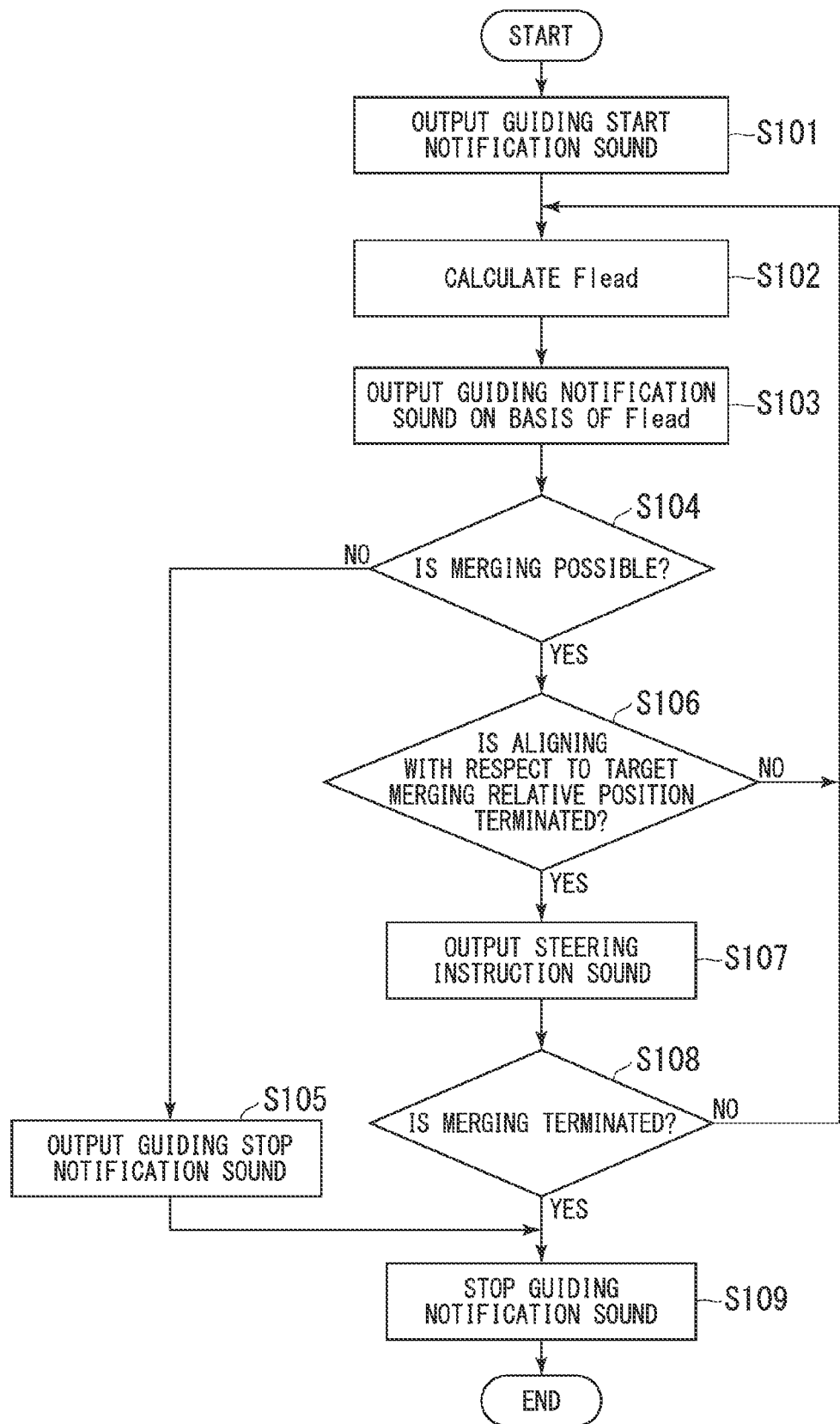
FIG. 16 is a flowchart showing an example of a control flow by the driving assistance device.

FIG. 16 is a flowchart showing an example of a control flow by the driving assistance device 100. Here, it is assumed that the input of the driver for starting the guidance is performed and the host vehicle M has entered the guiding start range GR.

The notification controller 110 outputs the guiding start notification sound prior to output of the guiding notification sound when the host vehicle M has entered the guiding start range GR (S101). Next, the notification controller 110 calculates the guiding parameter Flead (S102). Then, the notification controller 110 specifies the sound parameter Psound on the basis of the guiding parameter Flead, and outputs the guiding notification sound corresponding to the specified sound parameter Psound (S103).

Next, the entry possibility determining part 112 determines whether merging is possible (S104). The notification controller 110 outputs the guiding stop notification sound (S105) when it is determined by the entry possibility determining part 112 that merging is impossible (S104: NO). Then, the notification controller 110 stops the output of the guiding notification sound (S109), and a series of processing is terminated.

The steering determining part 111 determines whether alignment of the host vehicle M with respect to the target merging relative position Pmt is terminated, i.e., whether it is a steering timing for entering the movement destination lane (S106) when it is determined by the entry possibility determining part 112 that merging is possible (S104: YES). The notification controller 110 returns to S102 to continue the processing when it is not determined that alignment of the host vehicle M with respect to the target merging relative position Pmt is terminated (S106: NO). Meanwhile, the notification controller 110 outputs the steering instruction sound (S107) when it is determined that alignment of the host vehicle M with respect to the target merging relative position Pmt is terminated (S106: YES).

Next, the notification controller 110 determines whether merging is terminated (S108). The notification controller 110 returns to S102 to continue the processing when it is not determined that merging is terminated (for example, a case in which steering by a driver is not performed) (S108: NO). Meanwhile, the notification controller 110 stops output of the guiding notification sound (S109) when it is determined that merging is terminated (S108: YES), and a series of processing is terminated.

[7. Effects]

In the embodiment, the guiding notification sound that differs in a case the host vehicle M requires acceleration and in a case the host vehicle M requires deceleration in order to perform alignment with respect to the target merging relative position Pmt is output from the speaker 60. According to the above-mentioned configuration, even in a case a position of another vehicle is not accurately ascertained by the driver, the driver can easily know an appropriate depression amount of the accelerator pedal 31 by the guiding notification sound. Accordingly, the position and the speed of the host vehicle M can be adjusted to perform the merging within a shorter time, and convenience can be improved. Further, for the driver, a burden of looking sideways is reduced and a frequency of looking forward is increased. For this reason, the sense of safety of the driver can also be improved.

In the embodiment, the guiding notification sounds having different tone heights or periods are output according to the speed variation degree (the necessary degree of acceleration/the necessary degree of deceleration) required for the host vehicle M. Accordingly, the driver can know the appropriate driving power (the accelerator opening Qap). That is, it is easy for the driver to know how much to depress the accelerator pedal 31 without having to search for the appropriate accelerator opening by oneself. Furthermore, the driver can appropriately know the accelerator operation in which a changing direction changes with the time sequence. Accordingly, the driver can easily perform continuous variable operations of the accelerator, and smoother merging can be realized. Accordingly, convenience can be further improved.

(First Variant)

Next, a first variant of the first embodiment will be described. In the first embodiment, the notification controller 110 outputs the guiding notification sounds having different tones from the speaker 60 when acceleration is required and when deceleration is required. Meanwhile, instead of/in addition to this, the notification controller 110 of the first variant outputs the guiding notification sounds having different tone colors from the speaker 60 when acceleration is required and when deceleration is required. Even in such a configuration, the appropriate depression amount of the accelerator pedal 31 can be guided to the driver upon merging, and convenience can be improved.

(Second Variant)

Next, a second variant of the first embodiment will be described. The second variant is an example of calculating a guiding parameter Flead using a simpler calculation model. For example, in the first embodiment, the merging guiding controller 105 calculates the guidance feedback driving power Ffb based on the response designated control. Meanwhile, the merging guiding controller 105 of the second variant calculates the guidance feedback driving power Ffb based on a model different from the response designated control (for example, a simpler model). Even in such a configuration, a depression amount of the accelerator pedal 31 can be guided to the driver upon merging, and convenience can be improved.

Second Embodiment

Next, a second embodiment will be described. The embodiment is distinguished from the first embodiment in that a sound parameter Psound' is specified on the basis of the relative position deviation Ept instead of the guiding parameter Flead. Other configurations than those described below are the same as those in the first embodiment.

Figure 17:
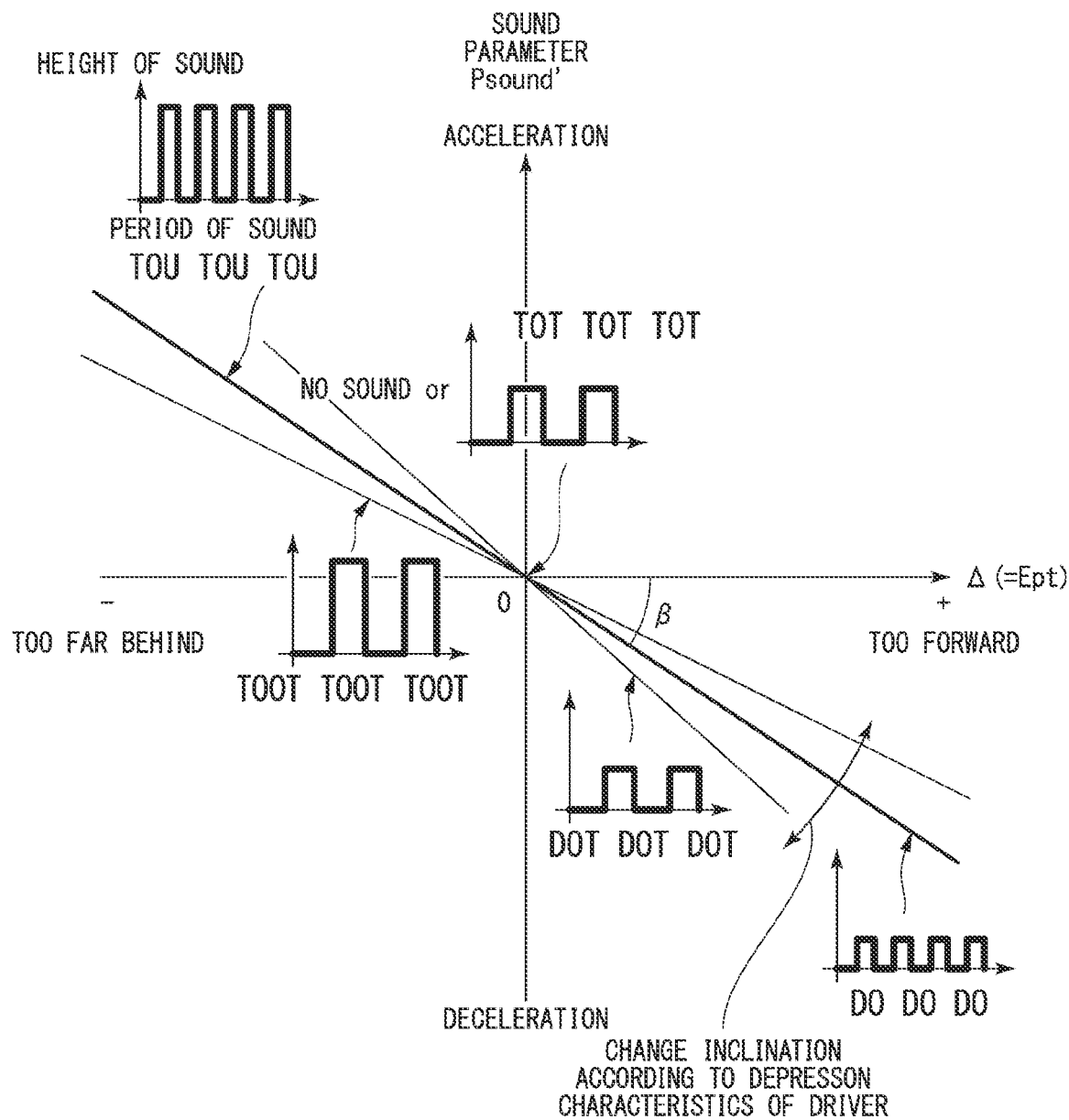
FIG. 17 is a view conceptually showing a guiding notification sound output from a notification controller of a second embodiment.

FIG. 17 is a view conceptually showing a guiding notification sound output from the notification controller 110 of the second embodiment. In the embodiment, the notification controller 110 specifies (determines) a type of the guiding notification sound (a tone height, a sound quality, a sound volume, an interval, or the like) that guides the driver upon merging based on the relative position deviation Ept, and outputs the specified (determined) guiding notification sound from the speaker 60. The guiding notification sound of the second embodiment is a notification sound configured to assist the driver to perform alignment of the host vehicle M with the target merging relative position Pmt in the advancing direction of the vehicle. That is, in the second embodiment, the speed adjustment is left to the driver, and is a simple way to notify of the position with respect to the target merging relative position Pmt (for example, too front/too behind) with a guiding notification sound.

For example, the notification controller 110 outputs the notification sounds having different tones from the speaker 60 in a case the vehicle is located too far behind the target merging relative position Pmt (i.e., acceleration is required) and in a case the vehicle is located too forward of the target merging relative position Pmt (i.e., deceleration is required). In the embodiment, the notification controller 110 outputs the guiding notification sound having a higher tone height compared to the case in which the vehicle is too far behind the target merging relative position Pmt and the case in which the vehicle is too forward of the target merging relative position Pmt from the speaker 60. That is, the notification controller 110 outputs a notification sound having a high tone height (for example, "toot toot toot") when the vehicle is too far behind the target merging relative position Pmt, and outputs a notification sound having a low tone height (for example, "Do Do Do") when the vehicle is too forward of the target merging relative position Pmt.

In the embodiment, the notification controller 110 makes intervals of the guiding notification sound (periods of emitting the notification sound) different according to the speed variation degree (the necessary degree of acceleration/the necessary degree of deceleration) required by the host vehicle M to perform the alignment. For example, the notification controller 110 makes the interval of the guiding notification sound shorter as the vehicle is too far behind the target merging relative position Pmt (i.e., as the necessary degree of acceleration is increased), and makes the interval of the guiding notification sound shorter as the vehicle is too forward of the target merging relative position Pmt (i.e., as the necessary degree of deceleration is increased).

The notification controller 110 may have different tones, sound volumes, or tone colors of the guiding notification sound according to the magnitude of the relative position deviation Ept instead of/in addition to the interval of the guiding notification sound. For example, the notification controller 110 may increase the tone height of the guiding notification sound as the vehicle is too far behind the target merging relative position Pmt, and decrease the tone height of the guiding notification sound as the vehicle is too forward of the target merging relative position Pmt. For example, the notification controller 110 may increase the sound volume of the guiding notification sound as the vehicle is too far behind the target merging relative position Pmt, and increase the sound volume of the guiding notification sound as the vehicle is too forward of the target merging relative position Pmt.

In the embodiment, the sound characteristics parameter (hereinafter, for the convenience of description, referred to as "an inclination $\beta$") is changed according to the host vehicle speed Ve. Change processing of the inclination $\beta$ is performed based on, for example, the following Equations (10) to (12). Psound' is a sound parameter, $\beta$ is an inclination of the sound parameter, $\Delta$ is a target position deviation (=Ept), Flead' is a virtual guiding parameter, Ef" is a driving power deviation, and Ksnd' is a sound parameter application gain (0<ksnd'). Further, the virtual guiding parameter Flead' is derived on the basis of a table shown in FIG. 18.

[Math. 10]

$$P\text{sound}'(k) = \beta(k)\Delta(k) \qquad (10)$$

[Math. 11]

$$Ef(k) = Fdrv(k) - Fdt(k) - F\text{lead}'(k) \qquad (11)$$

[Math. 12]

$$\beta(k) = \begin{cases} \beta(k-1) + Ksnd'Ef'(k) & \text{(When executing guidance)} \\ \beta(k-1) & \text{(When not executing guidance)} \end{cases} \qquad (12)$$

Figure 18:
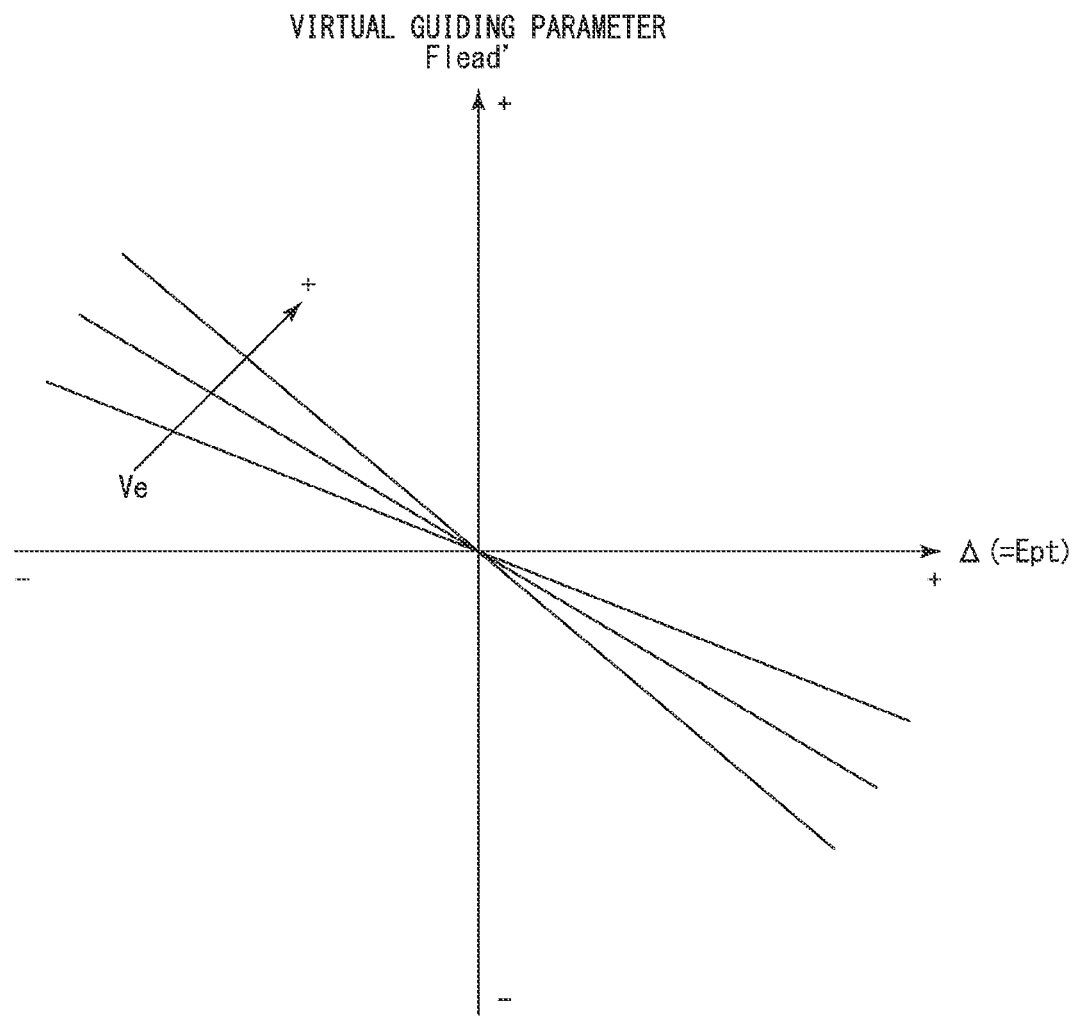
FIG. 18 is a view conceptually showing a relationship between a target position deviation, a virtual guiding parameter and a host vehicle speed.

FIG. 18 is a view conceptually showing a relationship between a target position deviation $\Delta$ (=Ept), the virtual guiding parameter Flead', and the host vehicle speed Ve. As shown in FIG. 18, as the host vehicle speed Ve is increased, a larger virtual guiding parameter Flead' is derived even at the same target position deviation $\Delta$. Accordingly, the guiding notification sound can be changed by reflecting the magnitude of the speed of the host vehicle M.

Even in such a configuration, a depression amount of the accelerator pedal 31 can be guided to the driver upon merging, and convenience can be increased.

Third Embodiment

Figure 19:
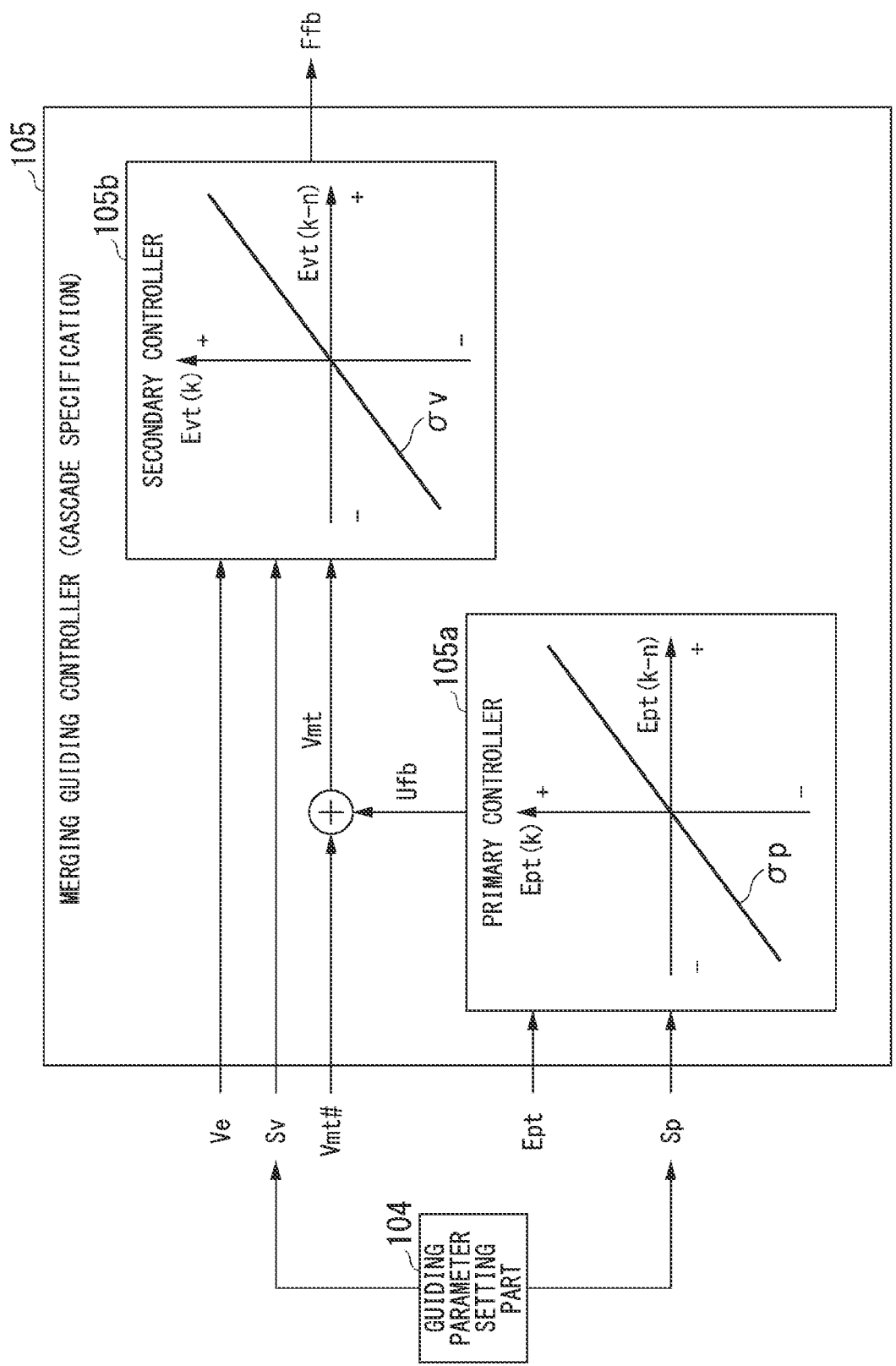
FIG. 19 is a view schematically showing functions of a merging guiding controller and a guiding parameter setting part of a third embodiment.

FIG. 19 is a view schematically showing functions of a merging guiding controller 105 and a guiding parameter setting part 104 of a third embodiment. The merging guiding controller 105 includes a primary controller 105*a* and a secondary controller 105*b*. The primary controller 105*a* functions as a position control controller, and the secondary controller 105*b* functions as a speed control controller.

The primary controller 105*a* determines a correction amount Ufb of the target merging speed Vmt of the host vehicle M so as to bring a first switching function σp(k), which is obtained by linearly coupling the relative position deviation Ept(k) and a past value Ept(k−n) of the relative position deviation, closer to zero and so as to bring the relative position deviation Ept(k) and the past value Ept(k−n) of the relative position deviation closer to zero. Here, n is a natural number. Accordingly, Ept(k−n) means a value with respect to a control cycle k before n cycles. The first switching function σp(k) is expressed by Equation (13). Sp(k) is a first guiding parameter, which is set within a range of −1<Sp(k)<0.

[Math. 13]

$$\sigma p(k) = Ept(k) + Sp(k) \cdot Ept(k-n) \quad (13)$$

The primary controller 105a calculates the correction amount Ufb based on, for example, Equations (14) to (16). In the Equations, Urch(k) is a reach rule input for position control, Uadp(k) is an adaptive rule input for position control, and Krch_p and Kadp_p are feedback gains.

[Math. 14]

$$Urch(k) = Krch\_p \cdot \sigma p(k) \quad (14)$$

[Math. 15]

$$Uadp(k) = Kadp\_p \cdot \sigma p(k) + Uadp(k-1) \quad (15)$$

[Math. 16]

$$Ufb(k) = Urch(k) + Uadp(k) \quad (16)$$

The merging guiding controller 105 determines the target merging speed Vmt by correcting a temporary target merging speed Vmt # using the correction amount Ufb(k) based on any one or both of the speed Vof of the preceding vehicle Mf and the speed Vob of the following vehicle Mb. The target speed deviation Evt(k) according to the third embodiment is a difference between the corrected target merging speed Vmt and the host vehicle speed Ve.

The secondary controller 105b calculates the guidance feedback driving power Ffb (k) so as to bring a second switching function σv(k), which is obtained by linearly coupling the target speed deviation Evt(k) and a past value Evt(k−m) of the target speed deviation, closer to zero and so as to bring the target speed deviation Evt(k) and the past value Evt(k−m) of the target speed deviation closer to zero. Here, m is a natural number. Accordingly, Evt(k−m) means a value with respect to the control cycle k before m cycles. The second switching function σv(k) is expressed as Equation (17). Sv(k) is a second guiding parameter, which is set within a range of −1<Sv(k)<0. Here, while n and m may be set to the same value, n and m can be adjusted such that a converging speed of the speed control is faster than a converging speed of the position control by setting them as n>m.

[Math. 17]

$$\sigma v(k) = Evt(k) + Sv(k) \cdot Evt(k-m) \quad (17)$$

The secondary controller 105b calculates the guidance feedback driving power Ffb on the basis of, for example, Equations (18) to (20). In the Equations, Frch(k) is a reach rule input for speed control, Fadp(k) is an adaptive rule input for speed control, and Krch_v and Kadp_v are feedback gains.

[Math. 18]

$$Frch(k) = Krch\_v \cdot \sigma v(k) \quad (18)$$

[Math. 19]

$$Fadp(k) = \quad (19)$$

$$\begin{cases} Kadp\_v \cdot \sigma v(k) + Fadp(k-1) & \text{(When executing guidance)} \\ -Fdrv(k) - Fff(k) - Ffb(k) & \text{(When not executing guidance)} \end{cases}$$

[Math. 20]

$$Ffb(k) = Frch(k) + Fadp(k) \quad (20)$$

The guidance feedback driving power Ffb is added to a feed-forward driving power Fff, and output to the notification controller 110 as the guiding parameter Flead. As described above, it is possible to make the relative position deviation Ept and the target speed deviation Evt approach to zero substantially at the same time like the first embodiment by calculating the guidance feedback driving power Ffb, in comparison with the first embodiment, bringing the relative position deviation Ept closer to zero is realized a little faster, and at this time, the target speed deviation Evt remains a little. For this reason, it is possible to cause the host vehicle M to reach the vicinity of the target merging relative position Pmt more quickly than that in the first embodiment, but an acceleration/deceleration felt by an occupant is increased. In addition, since the third embodiment has a feature in which the control does not oscillate even if the feedback gain becomes larger compared to the first embodiment, this also makes it possible to reach the host vehicle M to the vicinity of the target merging relative position Pmt more quickly than that in the first embodiment.

The guiding parameter setting part 104 sets at least a first guiding parameter Sp(k) on the basis of the traveling environment of the host vehicle M. For example, like the first embodiment, the guiding parameter setting part 104 acquires the traveling road information RI from the detection part 101, and sets the first guiding parameter Sp(k) such that an absolute value of the first guiding parameter Sp(k) is increased as a merging-usable distance included in the traveling road information RI is longer, and such that an absolute value of the first guiding parameter Sp(k) is reduced as the merging-usable distance is shorter. Accordingly, it is possible to make the relative position deviation Ept(k) preferentially zero when the remaining distance to the merging is short, and rapid merging can be realized. Meanwhile, by increasing the absolute value of the first guiding parameter Sp(k) when the merging-usable distance is sufficiently long, merging control in which ride comfort is prioritized by suppressing acceleration/deceleration is performed.

The guiding parameter setting part 104 may set a second guiding parameter Sv(k) to a fixed value, or may set it to a variable value that is varied according to a change of the first guiding parameter Sp(k).

According to the above-mentioned third embodiment, it is possible to perform smoother speed adjustment and to perform control that prioritizes alignment compared to the first embodiment.

Variant of Third Embodiment

In the third embodiment, the secondary controller 105b may perform control using the equivalent control input. A function of the primary controller 105a is equal to the third embodiment. The secondary controller 105b according to the variant of the third embodiment calculates the guidance feedback driving power Ffb on the basis of, for example, the above-mentioned Equations (18), (19) and (21). In Equation (21), Frch(k) is a reach rule input for speed control, Fadp(k) is an adaptive rule input for speed control, and Feq(k) is an equivalent control input. The equivalent control input Feq(k) is expressed as Equation (22) using the temporary target merging speed Vmt #. The equivalent control input Feq(k) is a term that acts to constrain the switching function σv(k) to zero after the switching function σv(k) becomes zero (in other words, the target speed deviation Evt(k−m) and the target speed deviation Evt(k) are constrained to a control line at which the switching function σv(k) becomes zero). The feedback gain can be increased by including the equivalent control input Feq(k) in the calculation, and as a result, faster merging can be realized. In Equation (22), M is a vehicle weight of the host vehicle M, and ΔT is a control period (for example, about several tens [ms] to several hundreds [ms]).

[Math. 21]

$$Ffb(k)=Frch(k)+Fadp(k)+Feq(k) \tag{21}$$

[Math. 22]

$$Feq(k)=(M/\Delta T)\times\{-Sv(k)\times Ve(k)+Sv(k)\times Ve(k-1)\}+(Sv(k)+1)\times Vmt\#(k)-(Sv(k)+1)\times Vmt\#(k-1)\} \tag{22}$$

As described above, the principle that defines the equivalent control input Feq(k) will be described. While the target merging speed Vmt(k+1) in the future for 1 control cycle will be required in principle in Feq(k), since it cannot be calculated, there is a need to delay the target merging speed Vmt, which is used in calculation of the target speed deviation Evt(k) and calculation of the equivalent control input Feq(k), by 1 control cycle. In addition, ideally, the target merging speed Vmt used in calculation of the equivalent control input Feq(k) should be the target merging speed Vmt at which the temporary target merging speed Vmt # is corrected with the correction amount Ufb(k) by the primary controller 105a.

When the equivalent control input Feq(k) is determined using the target merging speed Vmt(k+1) in the future for 1 control cycle, it becomes Equation (24) on the premise of Equation (23). When it is shifted 1 control cycle before in order to eliminate the target merging speed Vmt(k+1) in the future for 1 control cycle from this equation, Equation (25) is obtained.

[Math. 23]

$$Evt(k)=Ve(k)-Vmt(k-1) \tag{23}$$

[Math. 24]

$$Feq(k)=(M/\Delta T)\times\{-Sv(k)\times Ve(k)+Sv(k)\times Ve(k-1)\}+Vmt(k+1)+(Sv(k)-1)\times Vmt(k)-Sv(k)\times Vmt(k-1)\} \tag{24}$$

[Math. 25]

$$Feq(k)=(M/\Delta T)\times\{-Sv(k)\times Ve(k)+Sv(k)\times Ve(k-1)\}+Vmt(k)+(Sv(k)-1)\times Vmt(k-1)-Sv(k)\times Vmt(k-2)\} \tag{25}$$

However, when the merging control is performed using the equivalent control input Feq(k) obtained by Equation (25), the primary controller 105a and the secondary controller 105b will resonate by an influence of a feed-forward controllative behavior change due to a delay of a merging speed target value Vmt and the equivalent control input Feq(k), and the controls of the position and the speed will diverge.

Therefore, on the premise of Equation (26) that has eliminated 1 control cycle delay of the target merging speed Vmt in a case of calculating the target speed deviation Evt(k), it is decided to determine the equivalent control input Feq(k) by Equation (27) while setting the merging target speed in the future by using a predicted value Vmt #(k+1) of the above-mentioned temporary merging target speed Vmt #.

[Math. 26]

$$Evt(k)=VM(k)-Vmt(k) \tag{26}$$

[Math. 27]

$$Feq(k)=(M/\Delta T)\times\{-Sv(k)\times Ve(k)+Sv(k)\times Ve(k-1)\}+Vmt\#(k+1)+(Sv(k)-1)\times Vmt\#(k-2)-Sv(k)\times Vmt\#(k-3)\} \tag{27}$$

Here, the predicted value Vmt #(k+1) of the temporary merging target speed Vmt # is represented as Vmt #(k)+ΔVmt #(k+1) when it is defined as ΔVmt #(k)=Vmt #(k)−Vmt #(k−1), which may be approximate to Vmt #(k)+ΔVmt #(k). According to the relationship, when it becomes Vmt #(k+1)=2×Vmt #(k)−Vmt #(k−1) and Equation (27) is organized using this, the above-mentioned Equation (22) is obtained.

In this way, according to the variant of the third embodiment, speed adjustment and alignment can be more rapidly performed while preventing divergence of control by determining an equivalent control input using the temporary merging target speed Vm# before correction by the primary controller 105a.

The above-mentioned embodiment will be expressed as follows.

A driving assistance device including:
 a storage device on which a program is stored; and
 a hardware processor,
 wherein the hardware processor executes the program to:
 derive a target relative position with respect to other vehicle, which is traveling in a movement destination lane that is a merging destination or a lane change destination of the host vehicle, for entering the movement destination lane based on a detection result of the other vehicle, and
 outputs a notification sound, which differs between a case in which acceleration is required for the host vehicle and a case in which deceleration is required for the host vehicle, from a speaker in order to perform an alignment with respect to the derived target relative position in an advancing direction of the host vehicle.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A driving assistance device comprising:
 a determining part configured to determine a target speed with respect to other vehicle, which is traveling in a movement destination lane that is a merging destination or a lane change destination of a host vehicle, for entering the movement destination lane based on a detection result of the other vehicle; and
 a notification controller configured to output a notification sound, which differs between a case in which acceleration is required for the host vehicle and a case in which deceleration is required for the host vehicle, from a speaker in order to perform a speed matching of the host vehicle with respect to the target speed determined by the determining part in an advancing direction of the host vehicle.

2. The driving assistance device according to claim 1, wherein the notification controller makes tone heights of the notification sound different between the case in which the acceleration is required and the case in which the deceleration is required.

3. The driving assistance device according to claim 1, wherein the notification controller outputs the notification sound with a higher tone height in the case in which the acceleration is required than the case in which the deceleration is required.

4. The driving assistance device according to claim 1, wherein the notification controller makes tone colors of the notification sound different between the case in which the acceleration is required and the case in which the deceleration is required.

5. The driving assistance device according to claim 1, wherein the notification controller makes intervals of the notification sound different according to a speed variation degree of the host vehicle which is required to perform the speed matching.

6. The driving assistance device according to claim 5, wherein the notification controller shortens the interval as a necessary degree of acceleration increases as the speed variation degree, and shortens the interval as a necessary degree of deceleration increases as the speed variation degree.

7. The driving assistance device according to claim 1, wherein the notification controller makes tone heights, sound volumes, or tone colors of the notification sound different according to a speed variation degree of the host vehicle required to perform the speed matching.

8. The driving assistance device according to claim 7, wherein the notification controller makes the tone height higher as a necessary degree of acceleration increases as the speed variation degree, and makes the tone height lower as a necessary degree of deceleration increases as the speed variation degree.

9. The driving assistance device according to claim 7, wherein the notification controller makes the sound volume louder as a necessary degree of acceleration increases as the speed variation degree, and makes the sound volume louder as a necessary degree of deceleration increases as the speed variation degree.

10. The driving assistance device according to claim 1, wherein the notification controller changes one or more elements among a tone height, a sound volume, a tone color, or an interval of the notification sound according to whether the acceleration or the deceleration is required for the host vehicle in order to perform the speed matching, and changes one or more other elements among the tone height, the sound volume, the tone color, or the interval of the notification sound according to a speed variation degree of the host vehicle which is required to perform the speed matching.

11. The driving assistance device according to claim 1, wherein the determining part determines the target speed to perform merging or lane change, and
the notification controller determines the notification sound based on driving power which causes a position and a speed of the host vehicle to simultaneously converge with respect to a target relative position and the target speed which are determined by the determining part, and outputs the determined notification sound from the speaker.

12. The driving assistance device according to claim 11, further comprising a deriving part configured to derive the driving power, which causes the position and the speed of the host vehicle to simultaneously converge with respect to the target relative position and the target speed which are determined by the determining part, based on response designated control,
wherein the notification controller determines the notification sound based on the driving power derived by the deriving part, and outputs the determined notification sound from the speaker.

13. The driving assistance device according to claim 12, wherein the deriving part derives the driving power so as to bring a switching function, which is obtained by linearly coupling a position deviation that is a deviation between the target relative position and a position of the host vehicle and a speed deviation that is a deviation between the target speed and a speed of the host vehicle, closer to zero and so as to bring the position deviation and the speed deviation closer to zero.

14. The driving assistance device according to claim 12, wherein the deriving part determines a correction amount of the target speed so as to bring a first switching function, which is obtained by linearly coupling a position deviation that is a deviation between the target relative position and a position of the host vehicle and a past value of the position deviation, closer to zero and so as to bring the position deviation and the past value of the position deviation closer to zero, and
determines the target speed by correcting a temporary target speed using the correction amount based on the speed of the other vehicle and derives the driving power to bring a second switching function obtained by linearly coupling a speed deviation that is a deviation between the target speed and a speed of the host vehicle and a past value of the speed deviation closer to zero and bring the speed deviation and the past value of the speed deviation closer to zero.

15. The driving assistance device according to claim 1, wherein the notification controller changes the notification sound according to depression characteristics for each driver with respect to an accelerator pedal.

16. The driving assistance device according to claim 1, wherein the notification controller changes the notification sound according to a distance that is usable in merging or lane change.

17. The driving assistance device according to claim 1, further comprising a steering determining part configured to determine a steering timing to enter the movement destination lane,
wherein the notification controller outputs a steering instruction sound, which is different from the notification sound, from the speaker at the steering timing determined by the steering determining part.

18. The driving assistance device according to claim 11, wherein the notification controller starts output of the notification sound according to entry of the host vehicle into a guiding start range which is between a front section of a preceding vehicle that is traveling just in front of the target relative position in the movement destination lane and a rear section of a following vehicle that is traveling just behind the target relative position in the movement destination lane in the advancing direction of the host vehicle.

19. The driving assistance device according to claim 18, wherein the notification controller outputs a guiding start notification sound, which is different from the notification sound, from the speaker prior to an output start of the notification sound in a case the host vehicle enters the guiding start range.

20. The driving assistance device according to claim 1, further comprising an entry possibility determining part configured to determine possibility of whether the vehicle is able to enter the movement destination lane,
wherein the notification controller outputs a guiding stop notification sound, which is different from the notification sound, from the speaker in a case the entry possibility determining part determines that the entry to the movement destination lane is impossible after the output of the notification sound has been started.

21. The driving assistance device according to claim 1, wherein the notification controller does not output the notification sound from the speaker in a case acceleration and deceleration are not required to perform the speed matching.

22. A driving assistance device comprising:
a determining part configured to determine a target speed with respect to other vehicle, which is traveling in a movement destination lane that is a merging destination or a lane change destination of a host vehicle, for entering the movement destination lane based on a detection result of the other vehicle; and
a notification controller configured to output a notification sound, which has different tone heights, sound volumes, tone colors, or intervals according to a speed variation degree of the host vehicle, from the speaker, the speed variation degree of the host vehicle being a degree required to perform a speed matching of the host vehicle with respect to the target speed determined by the determining part in an advancing direction of the host vehicle.

23. A driving assistance method, which is performed by a computer, the method comprising:
determining a target speed with respect to other vehicle, which is traveling in a movement destination lane that is a merging destination or a lane change destination of a host vehicle, for entering the movement destination lane based on a detection result of the other vehicle; and
outputting a notification sound, which differs between a case in which acceleration is required for the host vehicle and a case in which deceleration is required for the host vehicle, from a speaker in order to perform a speed matching of the host vehicle with respect to the determined target speed in an advancing direction of the host vehicle.

24. A non-transitory computer-readable storage medium, on which a program is stored and causes a computer to:
determine a target speed with respect to other vehicle, which is traveling in a movement destination lane that is a merging destination or a lane change destination of a host vehicle, for entering the movement destination lane based on a detection result of the other vehicle; and
output a notification sound, which differs between a case in which acceleration is required for the host vehicle and a case in which deceleration is required for the host vehicle, from a speaker in order to perform a speed matching of the host vehicle with respect to the determined target speed in an advancing direction of the host vehicle.

* * * * *